United States Patent
Jalali et al.

(10) Patent No.: US 12,381,634 B1
(45) Date of Patent: Aug. 5, 2025

(54) SYSTEM AND METHOD OF OPTICAL BASE STATION(S) AND AUTONOMOUS WIRELESS HOTSPOT DEVICE(S)

(71) Applicant: WIRELESS PHOTONICS, LLC, El Segundo, CA (US)

(72) Inventors: Bahram Jalali, Los Angeles, CA (US); Nicholas Jalali, Los Angeles, CA (US); William R Ryan, Los Angeles, CA (US); Ahmadreza Rofougaran, Newport Coast, CA (US)

(73) Assignee: Wireless Photonics, LLC, El Segundo, CA (US)

( * ) Notice: Subject to any disclaimer, the term of this patent is extended or adjusted under 35 U.S.C. 154(b) by 0 days.

(21) Appl. No.: 19/094,892

(22) Filed: Mar. 29, 2025

Related U.S. Application Data

(63) Continuation-in-part of application No. 19/026,263, filed on Jan. 16, 2025, which is a continuation of application No. 18/882,739, filed on Sep. 11, 2024, now Pat. No. 12,267,113.

(51) Int. Cl.
*H04B 10/80* (2013.01)
*H02J 50/30* (2016.01)
*H02J 50/80* (2016.01)

(52) U.S. Cl.
CPC ........... *H04B 10/807* (2013.01); *H02J 50/30* (2016.02); *H02J 50/80* (2016.02); *H04B 10/803* (2013.01)

(58) Field of Classification Search
None
See application file for complete search history.

(56) References Cited

U.S. PATENT DOCUMENTS

| | | | |
|---|---|---|---|
| 2004/0266367 A1* | 12/2004 | Tuominen | H04B 10/807 455/91 |
| 2019/0229558 A1* | 7/2019 | Pigeon | A61N 1/3787 |
| 2020/0382198 A1* | 12/2020 | Ashrafi | H04B 7/155 |
| 2020/0403457 A1* | 12/2020 | Nydell | G02B 19/009 |
| 2023/0016800 A1* | 1/2023 | Nugent, Jr. | H02J 50/005 |

* cited by examiner

*Primary Examiner* — David W Lambert
(74) *Attorney, Agent, or Firm* — Mark R. Kendrick

(57) ABSTRACT

An optical power and data delivery system includes an optical base station and an autonomous wireless hotspot device. The optical base station includes routers, a media converter device, a optical data transceiver configured to transmit the received data laser light beam; one or more power laser devices configured to transmit a power laser light beam, a beam combining device to generate and transmit a combined power and data laser light beam through a first optical antenna. The autonomous wireless hotspot device includes a second optical antenna configured to receive the combined data and power laser light beam, an optical dividing device, an optical data transceiver, a media converter device and wireless communication transceivers to transmit wireless data signals and one or more laser power converters to receive the power laser light beam and to convert the power laser light beam into electrical energy.

20 Claims, 14 Drawing Sheets

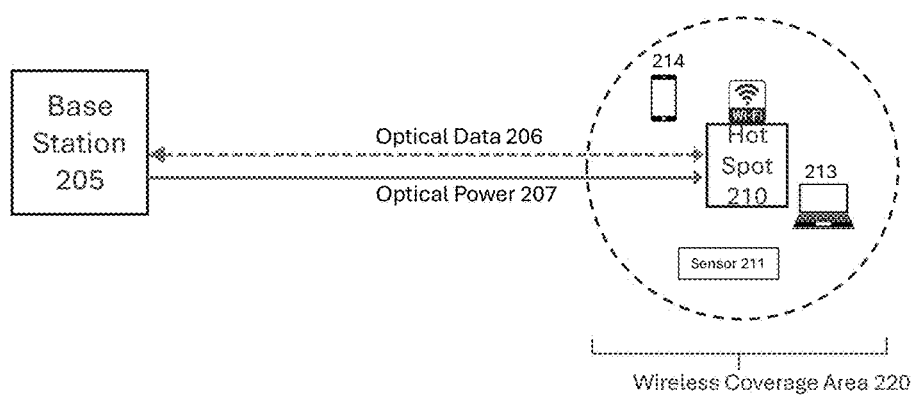

FIG. 2A

Benefits:
- Hotspot can be setup quickly and cheaply without needing to run cables, or without consuming valuable RF bandwidth.
- Hotspots can be replicated covering a large area but with low RF power in each hotspot.
  Reduced transmit RF power and coverage area improves privacy (makes is harder for hackers to eavesdrop).
  Improves network security. Also, reduced exposure to RF radiation.
- Free space optical data delivery to the hotspot is more energy efficient than RF delivery due to a much lower beam divergence at optical wavelengths.

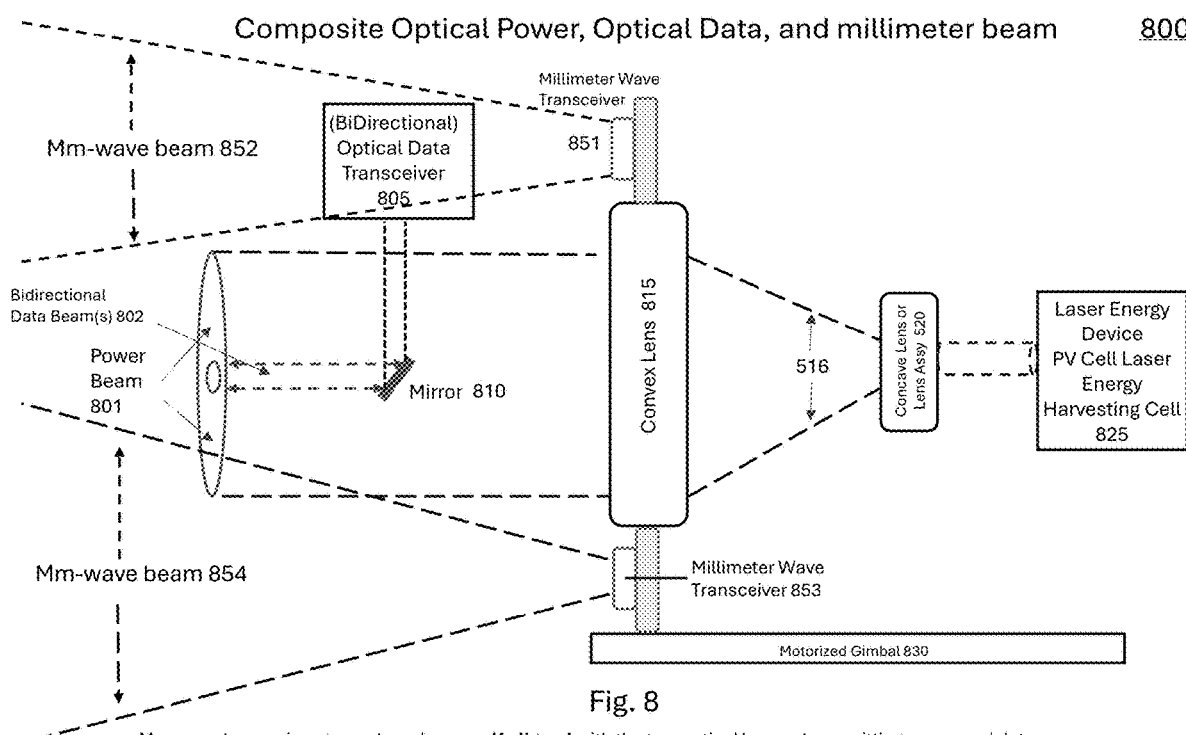

Fig. 8

Mm-wave transceiver generates a beam self aligned with the two optical beams transmitting power and data
Adding the mm-wave provides:
    Backup data, i.e. redundancy when optical path is blocked or when data laser fails
    Coarse alignment with the opposite node
    Side channel for network management
The three beams are self aligned – not geometrically independent
Ideal for satellite to ground comm link. When clouds block laser path, the link will continue to operate via the mm-wave beam Single hybrid beam having 3 constituents
Relative position of mm-wave and optical beams may vary but are fixed w/respect to each other
Cross section of the composite optical power + optical data + mm-wave hybrid beam

SYSTEM AND METHOD OF OPTICAL BASE STATION(S) AND AUTONOMOUS WIRELESS HOTSPOT DEVICE(S)

CROSS-REFERENCE TO RELATED APPLICATIONS/INCORPORATION BY REFERENCE

This application is a continuation in part of application Ser. No. 19/026,263 filed Jan. 16, 2025, titled "Autonomous Wireless Hotspot Device," which is a continuation of application Ser. No. 18/882,739, filed Sep. 11, 2024, titled "Autonomous Wireless Hotspot Device," the entireties of which are hereby incorporated by reference.

FIELD OF TECHNOLOGY

The claimed subject matter and technology is related to optical wireless power grid system or network and method for communication, sensor and Internet of Things devices.

BACKGROUND

In many cases, wireless communication is desired in spaces or environments where there is no electrical power available. Further, in many cases, radiofrequency bandwidth is limited so other forms of wireless communications may need to be utilized. Also, as discussed in co-pending patent application Ser. No. 18/626,696, "Optical Wireless Power Grid System and Method for Communication, Sensor, and IOT Devices," obtaining additional power for specific indoor areas has always been difficult due to a due to a requirement of laying cables either within walls or structures (and thus requiring construction) or outside of walls (which creates an unpleasing design aesthetic). In addition, it is always difficult to get work done in existing indoor buildings and thus there may be long lead times required to have any new networking components installed.

There is a need for wireless communication devices that do not require power and are also able to receive data so that they can provide a gateway or connection to communication networks such as intranets and/or the internet. In other words, there is a need for wireless routers or hotspot device that are autonomous and do not need wall electrical power (or power provided by a cable) and that also can transmit and receive data.

BRIEF DESCRIPTION OF DRAWINGS

FIG. 2A illustrates a high level data flow diagram of a wireless optical power and data system according to exemplary embodiments;

FIG. 8 illustrates a block diagram of a receiving device receiving a composite optical power, optical data and millimeter wave beam according to exemplary embodiments;

DETAILED DESCRIPTION OF THE DISCLOSURE

The following detailed description provides a better understanding of the features and advantages of the subject matter described in the present disclosure in accordance with the embodiments disclosed herein. The following detailed description describes a method and system that utilizes an optical transceiver and an autonomous optical wireless hotspot device to establish optical wireless communication in indoor and/or large controlled environments. In some embodiments, these large controlled environments may be outdoor environments where line of sight is available between the optical transceiver and the autonomous optical wireless hotspot device.

In the following description, reference is made to the accompanying drawings, which form a part hereof, and in which is shown, by way of illustration, various embodiments of the present disclosure.

Figure 1:
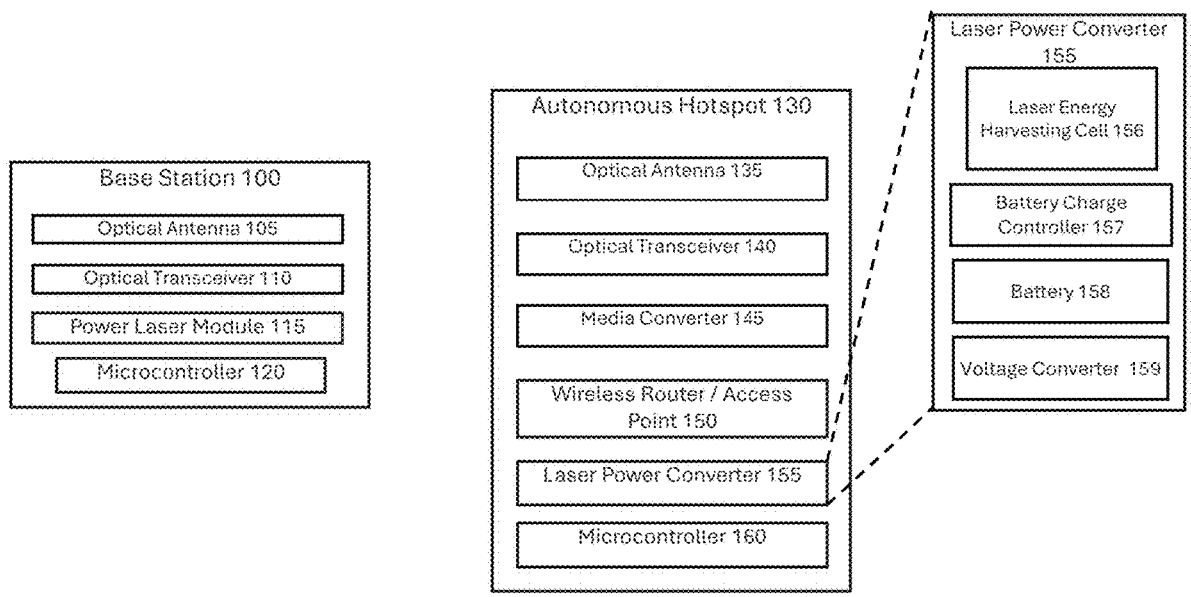
FIG. 1 is a block diagram that illustrates an optical wireless communication system including an optical base station and/or an autonomous wireless hotspot in accordance with exemplary embodiments of the disclosure.

FIG. 1 is a block diagram that illustrates an optical wireless communication system for communicating data and power including an optical base station and/or an autonomous wireless hotspot in accordance with exemplary embodiments of the disclosure. In exemplary embodiments, the optical wireless communication for communicating power and data may include one or more base stations 100 and/or one or more autonomous wireless hotspots or hotspot devices 130. Although only one base station 100 and one autonomous wireless hotspot device 130 is shown in FIG. 1, the optical wireless communication system described herein may include multiple base stations and corresponding hotspot devices or alternatively tens, hundreds and/or thousands of base stations and associated hotspot devices as described in detail below. Hotspot and hotspot devices may be used interchangeably within the specification.

In exemplary embodiments, the one or more optical base stations 100 may be communicatively coupled to the one or more autonomous wireless hotspots 130. In some embodiments, the communicative coupling may be optical coupling. In exemplary embodiments, the one or more optical base stations 100 may include an optical antenna 105, one or more optical transceivers 110, one or power laser modules 115 and/or one or more microcontrollers 120. In exemplary embodiments, the one or more optical base stations 100 may also include one or more memory devices (not shown) and/or computer-readable instructions (not shown). In some implementations, the computer-readable instructions may be stored in the one or more memory devices and may be executable by the one or more microcontrollers 120 to operate and/or control operations of the one or more base stations 100. In exemplary embodiments, the power laser module 115 may be optically coupled and/or electrically coupled or connected to the optical antenna 105. In exemplary embodiments, the power laser module 115 may generate and communicate a plurality of power laser light beams to the optical antenna 105 and the optical antenna 105 may direct the communicated plurality of power laser light beams to the autonomous wireless hotspot 130. In exemplary embodiments, the power laser module 115 may generate and communicate a power laser light beam to the optical antenna 105 and the optical antenna 105 may direct the communicated power laser light beam to the autonomous wireless hotspot. In exemplary embodiments, the one or more optical transceivers 110 may receive data communication signals from a wireless router (of other data transmission device) and may convert the electrical data communication signals into optical data signals. In exemplary embodiments, an optical transceiver 110 may communicate a data laser beam to the autonomous wireless hotspot. In exemplary embodiments, the one or more optical transceivers 110 may communicate the plurality of optical data signals (or data laser light beams) to the autonomous wireless hotspot 130. In some implementations, the power laser light beams may be aligned with the optical data signals. In some implementations, the power laser light beams may be combined with the optical data signals (or data laser light beams) in order to reduce complexity. In some implementations, the power laser light beam may be aligned with the data laser light beam and may be a hybrid or combined power data laser light beam (or a combined power laser light beam and data laser light beam).

In exemplary embodiments, the autonomous wireless hotspot 130 may include an optical antenna 135, one or more optical transceivers 140, one or more media converters 145, one or more wireless routers or access points 150, one or more laser power converters 155 and/or one or more microcontrollers 160. One important significant aspect of the claimed subject matter is that the autonomous wireless hotspot 130 does not include a power interface or a power cable interface and generates all power internally. In other words, the autonomous wireless hotspot 130 is self-powering (e.g., the laser power converter 155 provides power to the autonomous wireless hotspot 130). In some embodiments, there may be one or more autonomous wireless hotspots 130. This is significant because it allows for autonomous wireless hotspots to be placed or positioned in locations where no power outlet or interface is required. For example, the autonomous wireless hotspots 130 may be placed on walls or on ceilings in office environments, manufacturing facility environments, outdoor structures, and/or sporting event venues, along with other similar venues. The autonomous wireless hotspots may be placed in indoor environments and/or outdoor environments.

In exemplary embodiments, the autonomous wireless hotspot 130 may include one or more optical antennas 135. In some embodiments, there may be at least two optical antennas 135. In these embodiments, one of the optical antennas 135 in the autonomous wireless hotspot 130 may be used for receiving data laser light beams and another one of the optical antennas 135 may be used for receiving power laser light beams. In exemplary embodiments, one optical antenna 135 may be utilized to receive combined data laser light beams and power laser light beams. In exemplary embodiments, an optical antenna 135 may be utilized to receive a combined power laser beam and data laser light beam. In other embodiments, the one or more optical transceivers 140 in the autonomous hotspot device 130 may be communicatively coupled to the one or more optical transceivers 110 in the base station 100 (where no optical antenna is necessary).

With respect to the data transmission, in exemplary embodiments, an optical antenna 135 may receive the combined power and data laser light beams from an optical antenna 105 in the base station 100, and the autonomous wireless hotspot 130 may separate out the data laser light beams and may communicate or transfer the data laser light beams to the one or more optical transceivers 140 in the autonomous wireless hotspot 130. In exemplary embodiments, an optical antenna 135 may receive the combined power and data laser light beam and may communicate or transfer the data laser light beam to one or more optical transceivers 140 in the autonomous wireless hotspot 130. In other embodiments, the optical antenna for the data transmission may receive the data laser light beams and the autonomous wireless hotspot 130 may transfer or communicate the data laser beams to the one or more optical transceivers 140. In exemplary embodiments, one or more optical transceivers 140 may be communicatively coupled to the one or more media converters 145. In exemplary embodiments, the one or more media converters 145 may receive the data laser light beams from the one or more optical transceivers 140 and may convert the data laser light beams into electrical data signals. In exemplary embodiments, a medial converter 145 may receive the data laser light beam from the optical transceiver 140 and may convert the data laser light beam into an electrical data signal(s). In exemplary embodiments, the one or more media converters 145 may be communicatively coupled to the wireless router or access point 150. In exemplary embodiments, the one or more media converters 145 may communicate the electrical data signals to the one or more wireless routers or access points 150. In exemplary embodiments, the wireless router or access point 150 may receive the electrical data signals and may generate wireless data signals based at least in part on the electrical data signals. In exemplary embodiments, the one or more wireless routers or access points 150 may transmit the wireless data signals to an environment around the wireless router or access point 150. In exemplary embodiments, the media converter 145 may communicate the electrical data signal(s) to a wireless router or access point 150 which may receive the electrical data signal(s) and may generate a wireless data signal(s). In this embodiment, the wireless router or access point 150 may transmit the wireless data signal(s) to an environment around the wireless router or access point. This may be an indoor environment, such as a room or a manufacturing facility or industrial facility. In other embodiments, the environment may be an outdoor environment where there is line-of-sight between the one or more optical base stations 100 and/or the one or more autonomous wireless hotspots 130.

With respect to power transmission, an optical antenna 135 in the autonomous hotspot 130 may receive the power laser light beams. In exemplary embodiments, an optical antenna 135 in the autonomous wireless hotspot 130 may receive the power laser light beam. In exemplary embodiments, the other optical antenna 135 may be communicatively coupled to one or more laser power converters 155. In exemplary embodiments, the other optical antenna 135 may direct and/or transmit the received power laser light beams to the one or more laser power converters 155. In exemplary embodiments, the optical antenna may direct and/or transmit the received power laser light beam to a laser power converter 155. In embodiments where there is a separate power optical antenna, the power optical antenna may receive the separate power laser light beams and direct the received power laser light beams to the one or more laser power converters. In exemplary embodiments, the one or more laser power converters 155 may receive the power laser light beams and convert the power laser light beams into electrical power. In exemplary embodiments, the laser power converter 155 may receive the power laser light beam and convert the power laser light beam into electrical power. In some embodiments, the one or more laser power converters 155 may include one or more resonant cavity photovoltaic devices. In exemplary embodiments, the generated electrical power may be utilized to power the autonomous hotspot 130. In some implementations, the generated electrical power from the laser power converter 155 may power all of the components of the autonomous hotspot 130. This is imperative and novel because this means the autonomous wireless hotspot 130 does not need to receive any power from a power cable or an external source power. This allows portability and use in indoor spaces and other embodiments without being tethered to an external power source. In exemplary embodiments, the autonomous hotspot 130 may also include one or more microcontrollers 160, one or more memory devices and/or computer-readable instructions. In exemplary embodiments, the computer-readable instructions may be accessed from the one or more memory devices and may be executable by the one or more processors in order to control operations of the autonomous hotspot 130. In exemplary embodiments, the electrical power generated by the laser power converter 155 may provide power to the one or more microcontrollers 160 and/or the one or more memory devices.

In exemplary embodiments, the one or more laser power converters 155 may include one or more laser energy harvesting cells 156, one or more battery charge controllers 157, one or more batteries 158 and/or one or more voltage converters 159. In exemplary embodiments, the one or more laser energy cells 156 may be optically coupled to the optical antenna 135 in the autonomous wireless hotspot 130. In exemplary embodiments, the optical antenna 135 may transmit or direct the power laser light beams to the one or more laser energy harvesting cells 156. In exemplary embodiments, the optical antenna 135 may transmit or direct the power laser light beam to one or more laser energy harvesting cells 156. In some implementations, the one or more laser energy harvesting cells or devices 156 may be a resonant cavity photovoltaic device or cell. In exemplary embodiments, the one or more laser energy harvesting cells or devices 156 may be coupled and/or connected to one or more battery charge controllers 157. In exemplary embodiments, the one or more laser energy harvesting cells 156 may convert the received power laser light beams into electrical power and may transmit the electrical power to the battery charge controller 157. In exemplary embodiments, a laser energy harvesting cell 156 (or multiple cells) may convert the receive power laser light beam into electrical power which is transmitted to the battery charge controller 157. In exemplary embodiments, the one or more battery charge controllers 157 may be coupled and/or connected to the one or more batteries 158 and/or the one or more voltage converters 159. In exemplary embodiments, the battery charge controller 157 may utilize the generated electrical power to charge the one or more batteries 158. In exemplary embodiments, the one or more battery charge controller 157 or the one or more batteries 158 may provide power to the one or more voltage converters 159. In some implementations, the one or more voltage converters 159 may receive the electrical power and may generate different direct current (DC) voltages, which may be utilized by different components in the autonomous hotspot 130. Thus, the autonomous wireless hotspot device may be self-powered.

In exemplary embodiments, the power laser beams and the data laser beams may be combined into combined data and power laser light beams. In exemplary embodiments, the power laser light beam and the data laser light beam may be combined in a combined data and power laser light beam. This specific embodiment will be discussed in more detail below with respect to FIGS. 4 and 5. In these embodiments, a combiner device (not shown) may combine the power laser light beams (from the power laser module 115) and the data laser light beams (from the optical transceiver 110) to create combined power and data laser lights beams. In exemplary embodiments, the base station optical antenna 105 may receive the combined power and data laser light beams and transmit the combined power and data laser beams to the autonomous wireless hotspot 130 through for example free space optical communication links. In some embodiments, the combined device may combine the power laser light beam and the data laser light beam and the base station optical antenna 105 may receive the combined power and data laser light beam and transmit the combined power and data laser light beam to the autonomous wireless hotspot device 130 through optical communication lines (e.g., free space optical links).

In exemplary embodiments, the optical antenna 135 in the autonomous wireless hotspot device 130 may receive the combined power and data laser light beams and may transmit, distribute or direct the combined power and data laser light beams to an optical splitter device (not shown) to separate or divide out the power laser light beams from the data laser light beams. In some embodiments, the optical antenna 135 in the autonomous wireless hotspot device 130 may receive the combined power and data laser light beam and may transmit or direct the combined to an optical splitter device. In exemplary embodiments, the separated data laser light beams or data laser light beam may be transmitted to the one or more optical data transceivers 140, which may in turn transmit or communicate the separated data laser light beams or data laser light beam to one or more media converters 145. In exemplary embodiments, the one or more media converters 145 may receive the data laser light beams (or data laser light beam) and convert the data laser light beams (or data laser light beam) into electrical data signals. In exemplary embodiments, the one or more media converters 145 may transmit or communicate the electrical data signals to the wireless router or access point 150. In exemplary embodiments, the wireless router or access point 150 may receive the electrical data signals, convert the electrical data signals into wireless (or radiofrequency) data signals and transmit the wireless data signals to an area around the autonomous hotspot. In exemplary embodiments, the separated out power laser light beams or power laser light beam may be transmitted to one or more laser power converters 155. In exemplary embodiments, the one or more laser power converters 155 may receive the power laser beams (or power laser beam) and may convert the power laser light beams (or power laser light beam) into electrical power or electrical energy. In exemplary embodiments, the electrical power or electrical energy may power all components of the autonomous hotspot device so that the autonomous hotspot does not need any power from a cable or similar power source.

FIG. 2A illustrates a high-level data flow diagram of a wireless optical power and data system according to exemplary embodiments. In FIG. 2A, in exemplary embodiments, one or more base stations 205 (e.g., optical base stations) may communicate optical power laser light beams 207 or a power laser light beam to an autonomous hotpot 210, which has wireless communication capabilities such as being able to transmit wireless communication signals. In exemplary embodiments, the autonomous wireless hotspot device may convert the optical power laser light beams 207 or power laser light beam into electrical power or electrical energy. In these embodiments, the autonomous hotspot device 210 may provide electrical power to all of the components in the autonomous wireless hotspot device 210.

In exemplary embodiments, the one or more base stations 205 may be located within 30 meters to 5 kilometers from the autonomous wireless hotspot device. This allows efficient operation of a free space optical path for communication between the two devices. In other embodiments, the one or more base stations 205 may be located within 50 kilometers from the autonomous wireless hotspot device and in other embodiments, the one or more base stations may be located within thousands of kilometers from the autonomous wireless hotspot device.

In exemplary embodiments, the one or more base stations 205 (e.g., optical base stations) may communicate optical data laser light beams or an optical data laser light beam to the autonomous wireless hotspot 210. The autonomous wireless hotspot device may also transmit optical data laser light beams (or a optical data laser light beam) to the one or more base stations 205. In exemplary embodiments, the autonomous hotspot device 210 may convert the optical data laser light beams or the optical data laser light beam into electrical data signals and then into wireless data signals. In exemplary embodiments, the autonomous hotspot device 210 may transmit or communicate the wireless data signals to a wireless coverage area 220. In some implementation, the wireless coverage area 220 may have a plurality of computing devices, mobile computing devices, and/or sensors located therein. As illustrated in FIG. 2A, in exemplary embodiments, the wireless coverage area 220 may communicate wireless data signals to a plurality of devices, including but not limited to a mobile computing device 214, a laptop computing device 213 and/or a sensor 211 in order for these devices to communicate to external devices utilizing an intranet and/or an internet. There may be multiple mobile computing or communication devices, laptop computing devices and/or sensors in the wireless coverage area.

Figure 2B:
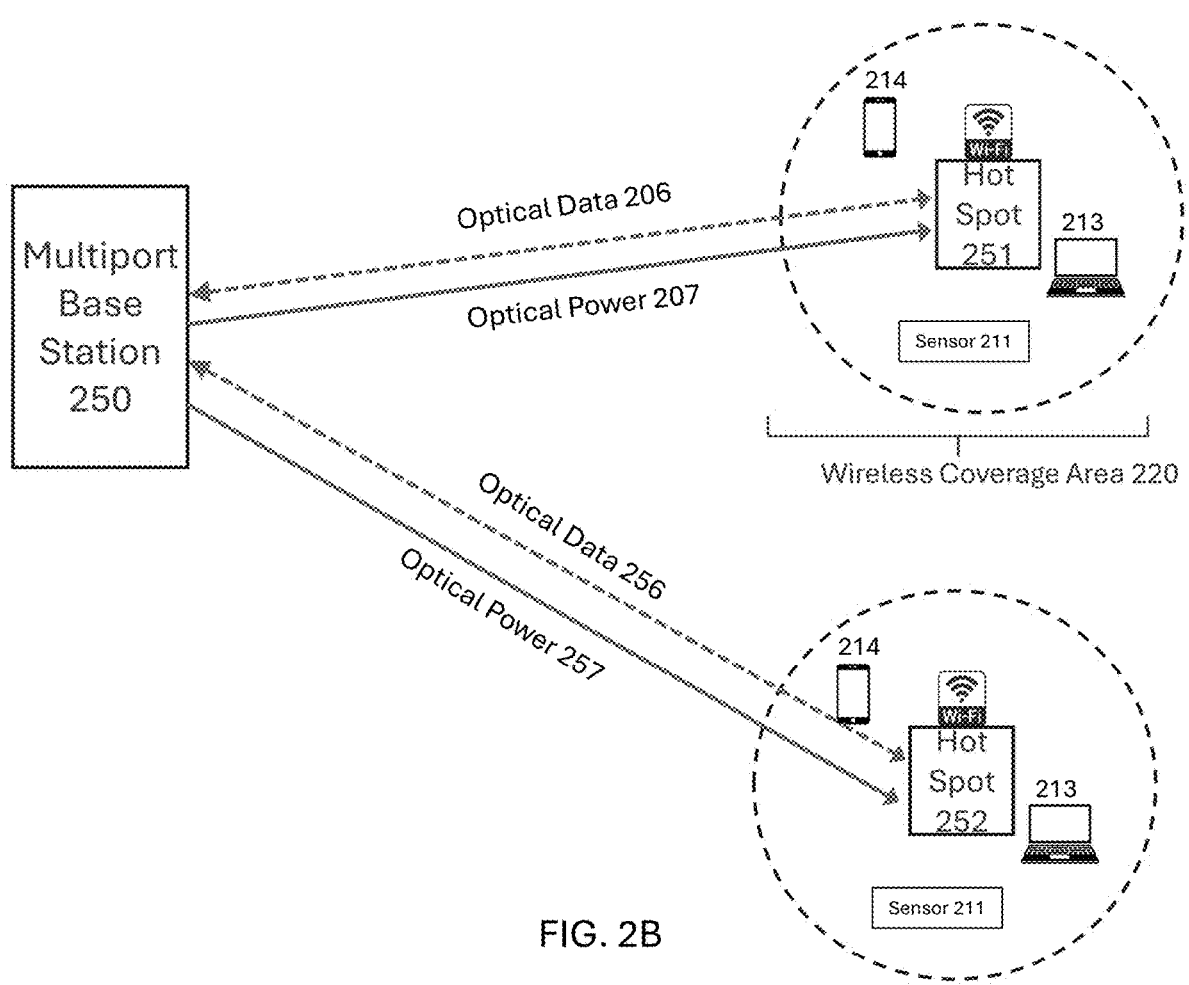
FIG. 2B illustrates a high level data flow diagram of a wireless optical power and data system including a multiport base station supporting multiple autonomous wireless hotspots according to exemplary embodiments.

FIG. 2B illustrates a high-level data flow diagram of a wireless optical power and data system including a multiport base station supporting multiple autonomous wireless hotspots according to exemplary embodiments. In FIG. 2B, in exemplary embodiments, a multiport base station 250 may communicate or transmit optical power laser light beams 207 and optical data laser light beams 206 to a first autonomous wireless hotspot 251 and also may communicate optical data laser light beams 256 and optical power laser light beams 257 to a second autonomous wireless hotspot 252. In some embodiments, the multiport base station 250 may communicate or transmit an optical power laser light beam 207 and an optical data laser light beam 206 to a first autonomous wireless hotspot 251 and also may communicate an optical data laser light beam 256 and an optical power laser light beam 257 to a second autonomous wireless hotspot 252. In other words, the multiport base station 250 may support communication with a plurality of autonomous wireless hotspots (two 251 and 252 are shown in FIG. 2B). In other embodiments, more than two autonomous wireless hotspots may be supported by the multiport base station 250 and FIG. 2B should not be seen as limiting in any aspect. In FIG. 2B, the multiport base station 250 may utilize two optical antennas in order to support the two autonomous wireless hotspots. In exemplary embodiments, the optical data laser light beams (or the optical data laser light beam) may be combined with optical power laser light beams (or the optical power laser light beam), as is discussed above and below and only one optical antenna may be utilized by the multiport base station. In exemplary embodiments, the optical data laser light beams 206 and 256 may be bidirectional and the optical power laser light beams 207 and 257 may be transmitted or communicated from the multiport base station 250 to the autonomous wireless hotspots 251 and 252. In exemplary embodiments, the optical data laser light beam 206 and 256 may be bidirectional and the optical power laser beam 207 and 257 may be transmitted from the multiport base station 250 to the autonomous wireless hotspot 251 and 252. In exemplary embodiments, there may be multiple multiport base stations 250 and/or there may be a plurality of autonomous wireless hotspots 251 and 252 for each of the multiple multiport base stations 250.

The benefits of the subject matter described with respect to FIGS. 1, 2A and 2B include that the autonomous hotspot may be set up or installed quickly and/or cheaply without the need to run power cables or data cables and also without consuming too much radiofrequency bandwidth. In exemplary embodiments, in order to cover a larger geographical area or more space, the autonomous hotspots 210 may be replicated or duplicated so that there is only a low radiofrequency power footprint for each hotspot (and corresponding physical area). The subject matter described herein provides increased privacy (and makes it harder for hackers to eavesdrop) because of the reduced transmission radiofrequency power and/or also coverage area. In addition, the subject matter described herein improves network security and/or also provides a reduced exposure to radiofrequency radiation. Further, the subject matter described herein utilizes free space optical data delivery to deliver data to the autonomous wireless hotspot device, which is more efficient than RF data delivery due to a much lower beams divergence at optical wavelengths.

Figure 3:
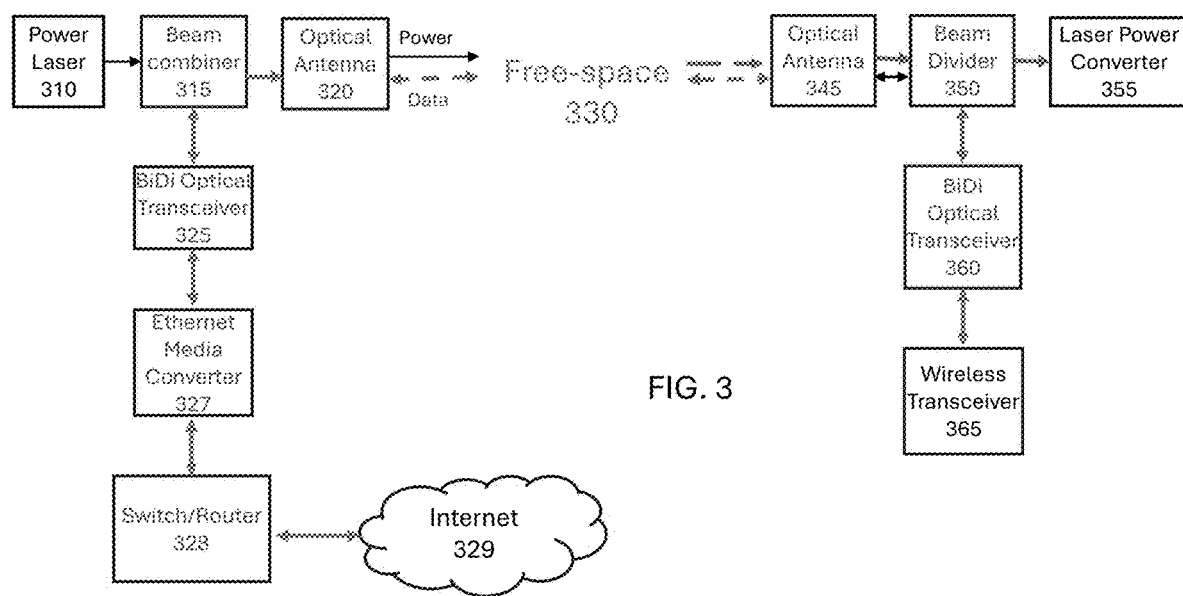
FIG. 3 illustrates a block diagram of a high level wireless optical power and data system according to exemplary embodiments.

FIG. 3 illustrates a high-level block diagram and data flow diagram of a wireless optical power and data system according to exemplary embodiments. In FIG. 3, in exemplary embodiments, the wireless optical power and data system 300 may include one or more base stations 305 and one or more autonomous wireless hotspots 340. In exemplary embodiments, the one or more base stations 305 may include one or more power laser devices 310, a laser beam combiner 315 (or multiple combiners), one or more bidirectional optical transceiver devices 325, one or more optical antennas 320, one or more Ethernet media converters 327, one or more switches or routers 328, and/or a global communication network (e.g., the Internet) 329. In exemplary embodiments, one or more autonomous wireless hotspots 340 may include one or more optical antennas 345, a laser beam divider or splitter 350 (or multiple dividers or splitters), one or more laser power converters 355, one or more bidirectional optical data transceivers 360 and/or one or more wireless communication transceivers 365. In FIG. 3, there is only one optical antenna device 320 and the power and data laser light beams are combined before being input or transmitted through the optical antenna 320 in the base station 305. In other embodiments, the base station 305 may be a multiport base station and may include one or more optical antennas and each of the optical antenna devices may combine power laser light beams and data laser light beams (or each of the optical antenna devices may combine a power laser light beam and a data laser light beam into a combined power and data laser light beam). In exemplary embodiments, the power laser device 310 may transmit or communicate power laser light beams (or a power laser light beam) to the beam combiner device 315. In exemplary embodiments, a global communications network 329 may communicate analog or digital data signals to one or more switches or routers 328. In embodiments, the one or more switches or routers 328 may communicate the received data signals to one or more Ethernet media converters 327. In exemplary embodiments, the one or more Ethernet converters 327 may convert the received analog or digital data signals into optical data laser light beams (or an optical data laser light beam). In exemplary embodiments, the bidirectional optical transceiver 325 may transmit or communicate the received optical data laser light beams (or a received optical data laser light beam) to the beam combiner device 315. In exemplary embodiments, the beam combiner device 315 may combine the optical power laser light beams with the optical data laser light beams to create combined optical power and data laser light beams and to communicate, transfer or transmit the combined power and data laser light beams to the optical antenna 320. In exemplary embodiments, the beam combiner device 315 may combine the optical power laser light beam with the optical data laser light beam to create a combined optical power and data laser light beam and to communicate, transfer or transmit the combined power and data laser light beam to the optical antenna 320. In exemplary embodiments, the optical antenna 320 may transmit or direct the combined power and data laser light beams (or the combined power and data laser light beam) through free space optical communication links 330 or free space channels to the autonomous wireless hotspot device 340. In exemplary embodiments, the autonomous hotspot's optical antenna 345 may receive the combined power and data laser light beams (or the combined power and data laser light beam) and direct the received combined power and data laser light beams (or the combined power and data laser light beam) to a beam divider 350 (or splitter) in the autonomous wireless hotspot device 340. In exemplary embodiments, the beam divider 350 (or splitter) may separate the received combined power and data laser light beams into received data laser light beams and received power laser light beams. In exemplary embodiments, the beam divider 350 (or splitter) may separate the received combined power and data laser light beam into a received data laser light beam and a received power laser light beam. In exemplary embodiments, the beam divider 350 may direct or transmit the received power laser light beams (or received power laser light beam) to the laser power converter 355 in order for the laser power converter 355 to convert the received power laser light beams (or received power laser light beam) into electrical power or electrical energy (which powers the components of the autonomous hotspot 340 without use of a cable or a wire or an external power source). In exemplary embodiments, the beam combiner or divider 350 may direct or transmit the received data laser light beams (or received data laser light beam) to an optical data transceiver 360. In exemplary embodiments, the optical data transceiver 360 may be a bidirectional optical data transceiver 360. In exemplary embodiments, the bidirectional optical data transceiver 360 may communicate the received data laser light beams (or received data laser light beam) to one or more media converters (not shown) to convert the received data laser light beams (or the received data laser light beam) to electrical data signals. In these implementations, the one or more media converters may transmit the electrical data signals to one or more wireless communication transceivers 365, which may convert the electrical data signals to wireless data signals. In some implementations, the wireless data signals may be received by one or more computing devices, IoT devices and/or sensor devices (as is discussed above with respect to FIGS. 2A and 2B). In exemplary embodiments, the one or more computing devices, IoT devices and/or sensor devices may wish to communicate wireless data signals back to the computing devices, IoT devices and/or sensor devices that originated the original data transmission or to other computing devices (such as server computing devices). In these embodiments, the one or more computing devices, IoT devices and/or sensor devices may communicate wireless data signals to the one or more wireless communication transceivers 365, which may convert the wireless data signals to return electrical data signals. In these embodiments, the return electrical data signals may be transmitted to the one or more media converter devices.

In these embodiments, the one or more media converter devices may convert the return electrical data signals into return optical data signals and communicate or transmit the return optical data signals (or received optical data laser light beams) to the one or more bidirectional optical transceiver devices 360. In exemplary embodiments, the one or more bidirectional optical transceiver devices 360 may communicate the received return optical data laser light beams (or received return optical data laser light beam) to either the beam combiner device 350 and/or the optical antenna 345. In exemplary embodiments, the optical antenna 345 may communicate the return optical data laser light beams (or return optical data laser light beam) through free-space optical communication links 330 to the base station's optical antenna 320. In exemplary embodiments, the optical antenna 345 may comminate the return optical data laser light beams (or return optical data laser light beam) to the beam combiner or divider 315 and/or the base station's bidirectional optical transceiver 325 in order for the return optical data laser beams (or the return optical data laser light beam) to be converted into received return data electrical signals (utilizing the one or more ethernet media converters 327, the switches or routers 328 and/or global communication network 329 for use by the originating computing device (or other computing device)).

Figure 4:
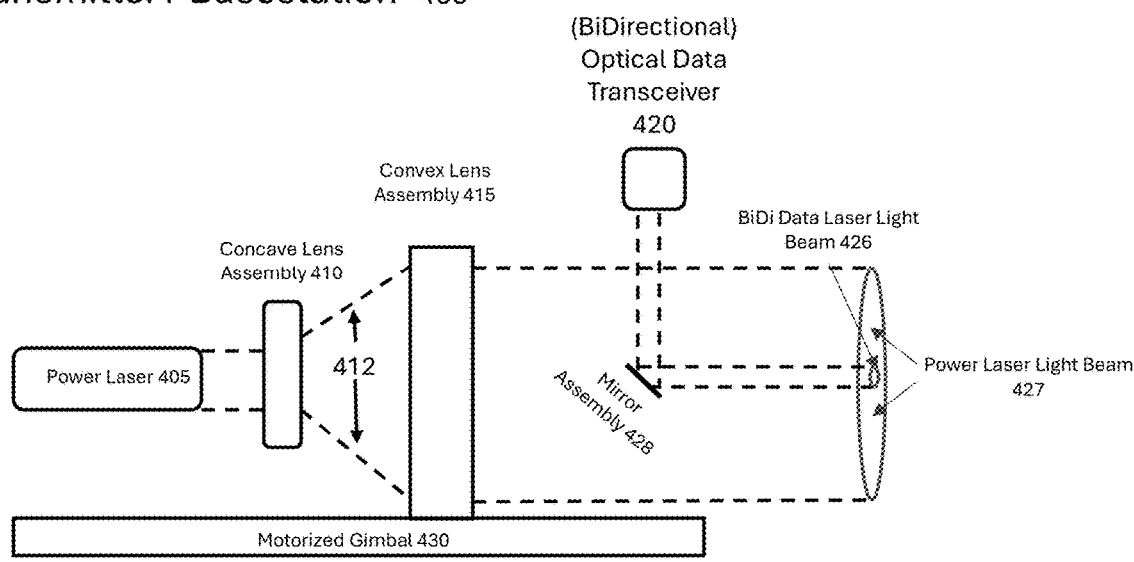
FIG. 4 illustrates a block diagram of a combined optical data and power transmitting device in a base station according to exemplary embodiments.

FIG. 4 illustrates a block diagram of a combined optical data and power transmitting device in an optical base station according to exemplary embodiments. In exemplary embodiments, the combined optical power and data transmitting device 400 includes one or more power laser devices 405, one or more concave lens assemblies 410, one or more convex lens assemblies 415, one or more optical data transceivers 420 and/or one or more mirror assemblies 428. In exemplary embodiments, the combined optical data and power transmitting device may further include one or more motorized gimbals 430 to move the one or more concave lens assemblies 410 and one or more convex lens assemblies 415 (and/or the one or more mirror assemblies 428). In exemplary embodiments, the one or more motorized gimbals 430 may include a mounting/alignment assembly, one or more motor assemblies, one or more processors or controllers, and/or one or more alignment sensors.

In exemplary embodiments, the one or more power laser devices 405 may be optically coupled to the one or more concave lens assemblies 410. In these embodiments, the one or more power laser devices 405 may communicate power laser light beams to the one or more concave lens assemblies 410 which may cause the power laser beams to diverge and form a wider light path (as shown by the dotted lines 412). In some embodiments, a power laser device 405 may communicate a power laser light beam to one or more concave lens assemblies 410 which may cause the power laser light beam to diverge and form a wider light path (which may be referred to as a divergent power laser light beam or diverged power laser light beam). In some implementations, the one or more lens assemblies 410 may be one or more concave lens assemblies. In exemplary embodiments, the one or more convex lens assemblies 415 may be optically coupled to the one or more concave lens assemblies 410. In exemplary embodiments, the divergent power laser light beams may then pass through the one or more convex lens assemblies 415, which may collimate the power laser light beams. In exemplary embodiments, the divergent power laser light beam may pass through the one or more convex lens assemblies 415, which may collimate the power laser light beam. The resulting power laser light beam may be referred to as an aligned power laser light beam. The combination of the one or more concave lens assemblies 410 and the one or more convex lens assemblies 415 may form a Galilean beam expander in order to produce collimated power laser light beams or a collimated power laser light beam (which may also be referred to as an aligned power laser light beam). The Galilean beam expander may expand the beam due to a sequence of the one or more concave lens assemblies 410 and the one or more convex lens assemblies 415 and an expansion ratio may depend on the lenses and the distances between them. In exemplary embodiments, the power laser light beams 427 may form a conical shape. In exemplary embodiments, the power laser beam 427 may form a conical shape. In exemplary embodiments, a media converter device may communicate the data laser light beams (or data laser light beam) to one or more optical data transceivers 420, which may be optically coupled to one or more mirror assemblies 428. In exemplary embodiments, the one or more optical data transceivers 420 may generate data laser light beams (or a data laser light beam) which may be transmitted to the one or more mirror assemblies 428. In exemplary embodiments, a media converter device may communicate a data laser light beam to an optical data transceiver 420, which may generate data laser light beam which may be transmitted to the one or more mirror assemblies 428. In some embodiments, the one or more data laser light beams do not pass through the lens assemblies 410 or 415. In exemplary embodiments, the generated data laser light beams may reflect off the one or more mirror assemblies 428 and the reflected data laser light beams may be within the light path or envelope of the power laser light beams 427. In exemplary embodiments, the generated data laser light beam may reflect off the one or more mirror assemblies 428 and the reflected data laser light beam may be within the light path or envelope of the power laser light beam 427. In exemplary embodiments, the one or more mirror assemblies 428 may reflect the data laser light beams 426 into a center of the power laser light beams 427 (or reflect the data laser light beam 426 into a center of the power laser light beam 427). Tis may also include being into a center of the aligned power laser light beam. This is due to the positioning of the one or more mirror assemblies with respect to the optical lens assemblies (e.g., the one or more concave lens assemblies 410 and/or the one or more convex lens assemblies 415). In these embodiments, this allows the data laser light beams 426 to be centered and/or aligned with the power laser light beams 427 (or allows the data laser light beam 426 to be centered and/or aligned with the power laser light beam 427 or aligned laser light beam)). This may be beneficial later when measuring if travelling through free space optics (or free space optical communication links) has distorted the power laser light beams and/or the data laser light beams (or power laser light beam and data laser beam). In addition, in exemplary embodiments, the one or more mirror assemblies 428 may also block the power laser light beams (or aligned power laser light beam) in an area where the data laser light beams may be located so that there is no interference between the data laser light beams and the power laser light beams. In some embodiments, the one or more mirror assemblies 428 may also block the power laser light beam in an area where the data laser light beam may be located.

In exemplary embodiments, the combined optical power and data laser transmitting device (or base station) 400 may be able to be aligned based on feedback from a receiving device or receiving node (which may be an autonomous wireless hotspot device). In exemplary embodiments, the receiving node may transmit an alignment signal (either optically or wirelessly via WiFi transceivers, local area network transceivers or personal area network transceivers). In exemplary embodiments, the receiving node may be an autonomous wireless hotspot device. In exemplary embodiments, the motorized gimbal or gimbal assembly 430 may include one or more alignment sensors, one or more processors or controllers, one or more motor assemblies, and one or more motor alignment assemblies. In exemplary embodiments, one or more alignment sensors on the laser transmitting device 400 may receive the alignment signal from the receiving node and transmit an alignment measurement to one or more processors or controllers. In exemplary embodiments, the one or more processors or controllers may analyze the alignment measurement and determine if the combined optical power and data laser transmitting device (or base station) needs to be mechanically adjusted or aligned. In exemplary embodiments, if the transmitting device is determined to need adjustment or alignment, the one or more processors or controllers may communicate a motor alignment signal to the one or more motor assemblies. In exemplary embodiments, the one or more motor assemblies may be coupled and/or connected to a mounting alignment assembly. In exemplary embodiments, the one or more motor assemblies may change an orientation and/or alignment of the motorized gimbal assembly 430 (and thus the lens assemblies 410 and 415 and the transmitting device 400) by communicating alignment instructions or commands. In these implementations, the resulting combined power and data laser light beams may be positionally adjusted to form a better alignment with the optical antennas of one or more receiving nodes (or one or more autonomous wireless communication devices). In other implementation, the resulting combined power and data laser light beam may be positionally adjusted to form a better alignment with the optical antenna of one or more receiving nodes (e.g., autonomous wireless communication devices).

Figure 5:
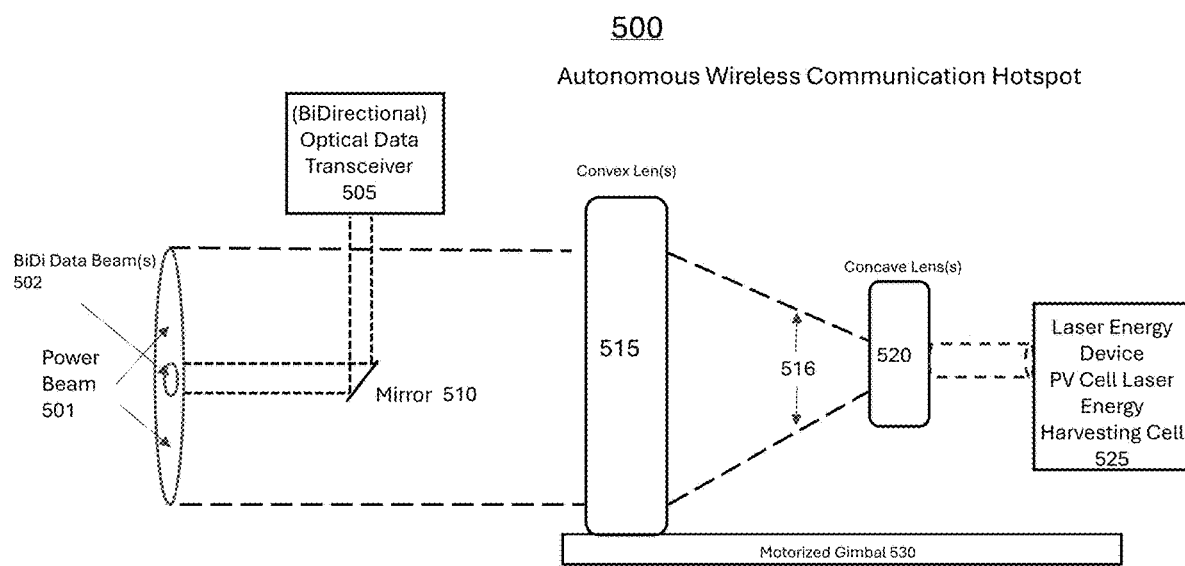
FIG. 5 illustrates a block diagram of a combined optical data and power receiving device according to exemplary embodiments.

FIG. 5 illustrates a block diagram of a combined optical data and power receiving device according to exemplary embodiments. In exemplary embodiments, the combined optical data and power receiving device 500 may include one or more optical data transceivers 505, one or more convex lens assemblies 515, one or more mirror assemblies 510, one or more concave lens assemblies 520, one or more motorized gimbals or gimbal assemblies 530 or and/or one or more laser power converters 525 (including one or more laser energy PV devices or cells). In exemplary embodiments, the combined power and data laser light beams are received by the receiver 500 and may pass through the one or more optical antennas (345 in FIG. 3). In exemplary embodiments, the combined power and data laser light beam may be received by the receiver 500 and may pass through the one or more optical antennas. In exemplary embodiments, the data laser light beams 502 (or the data laser light beam) may be reflected by the one or more mirror assemblies 510 to one or more optical data transceivers 505 (which may be one or more bidirectional optical data transceivers 505). In exemplary embodiments, the data laser light beams (or data laser light beam) are processed as discussed above with respect to FIGS. 1, 2A, 2B and 3 and will not be repeated here. In exemplary embodiments, the power laser light beams 501 may pass through one or more convex lens assemblies 515 which may narrow a width of the power laser light beams or may converge the power laser light beams (as shown by reference number 516). In exemplary embodiments, the power laser light beam 501 may pass through the one or more convex lens assemblies 515 which may narrow a width of the power laser light beam (or converge the power laser light beam). In exemplary embodiments, the converged power laser light beams may be directed or transmitted through one or more convex lens assemblies 520 to align and/or collimate the power laser light beams so that the power laser light beams are transmitted, transferred or communicated to the laser energy device 525 and specifically the photovoltaic laser energy device (or cells) in the laser power converter or laser energy device 525. In exemplary embodiments, the converged power laser light beam may be directed or transmitted through the one or more convex lens assemblies 520 to align and/or collimate the power laser light beam are transmitted, transferred or communicated to the laser energy device. The combination of the one or more concave lens assemblies 410 and the one or more convex lens assemblies 415 may form a Galilean beam expander in order to produce collimated power laser light beams (or collimated power laser light beam). These may also be referred to as an aligned power laser light beam. The Galilean beam expander may reduce (or expand) the beam due to a sequence of the one or more convex lens assemblies 515 and the one or more concave lens assemblies 520 and a reduction ratio (or expansion ratio) may depend on the lenses and the distances between them. In exemplary embodiments, the power laser light beams 427 (or the power laser light beam) may form a conical shape. The operation of the laser power converter is described in FIGS. 1, 2A, 2B and 3 and will not be repeated here. In exemplary embodiments, when the bidirectional optical data transceiver 505 in the receiving device 500 wants to transmit data back to the originating transmitting device (or another device), the bidirectional optical data transceiver 505 may communicate the data laser beams (or a data laser light beam) to the one or more mirror assemblies 510 which will reflect or transmit the data laser beams (or the data laser light beam) through the optical antenna to free space optical channels or free space optical communication links (as is described in detail in FIG. 3) and back to the original transmitting device (which may be an optical base station as describe in FIGS. 1 to 3) The one or more convex lens assemblies 515 and the one or more concave lens assemblies 520 may form a Galilean beam reducer and produce collimate power laser light beams that are passed, transmitted or transferred to the laser energy device 525.

In exemplary embodiments, the combined optical power and data laser transmitting device may be able to be aligned with the combined optical power and data laser receiving device based on feedback from the transmitting device (which may be the base station). In exemplary embodiments, the transmitting node may transmit an alignment signal (either optically or wirelessly via WiFi, local area network communications or personal area network communication). In exemplary embodiments, an autonomous hotspot motorized gimbal or gimbal assembly 530 may include one or more alignment sensors, one or more processors or controllers, one or more motor assemblies, and one or more motor alignment assemblies. In exemplary embodiments, one or more alignment sensors on the motorized gimbal assembly 530 may receive an alignment signal (from the transmitting node) and may transmit an alignment measurement to one or more processors or controllers in the motorized gimbal 530 or the autonomous hotspot 500. In exemplary embodiments, the one or more processors or controllers may analyze the alignment measurement and determine if any components in the autonomous wireless hotspot device 500 may need to be mechanically adjusted or aligned to obtain a better and/or higher quality signal from the transmitting device or base station. In exemplary embodiments, if the receiving node (or autonomous wireless hotspot) is determined to need adjustment or alignment, the one or more processors or controllers may communicate a motor alignment signal to the one or more motor assemblies. In exemplary embodiments, the one or more motor assemblies may be coupled and/or connected to the motorized gimbal assembly 530. In exemplary embodiments, the one or more motor assemblies may change an orientation and/or alignment of the motorized gimbal assembly by communicating alignment instructions or commands. In these implementations, the resulting combined power and data laser light beams may be adjusted to form a better alignment with the one or more transmitting nodes (or one or more base stations). In these implementations, the resulting combined power and data laser light beam may be adjusted to form a better alignment with the transmitting node (or base station).

Figure 6:
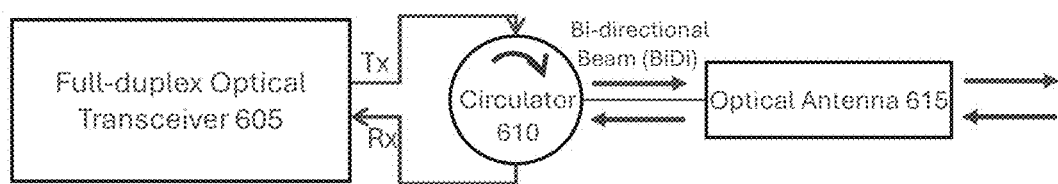
FIG. 6 illustrates a bidirectional data transceiver according to exemplary embodiments.

In exemplary embodiments, the bidirectional optical data transceivers may utilize an optical circulator in order to only transmit the data laser light beams (or data laser light beam) via one physical free space optical channel or free space optical communication link (which may save bandwidth and minimize alignment issues between the transmitting and receiving devices). FIG. 6 illustrates a block diagram of interaction of a bidirectional optical transceiver, an optical circulator and/or an optical antenna. In exemplary embodiments, the one or more full-duplex bidirectional optical data transceivers 610 be communicatively coupled to the one or more optical circulators 615. In exemplary embodiments, the one or more bidirectional optical data transceivers 610 may include two separate transmit (Tx) and receive (Rx)

ports and thus provides two physical optical channels (transmit channel Tx 611 and receive channel 612). It is very difficult to align two separate physical optical beams because it is very challenging to control roll in addition to pitch and yaw for both optical beams. In contrast, a single bidirectional physical laser light beam can be aligned without the necessity of controlling the yaw axis due to the circular symmetry of a single laser light beam. In exemplary embodiments, the one or more optical circulators 615 may be used to separate optical signals that travel in opposite directions through the free-space optical channel, for example to achieve bi-directional transmission over a single free-space optical channel. In other words, the data laser light beams (or a data laser light beam) may flow in both directions between the optical antenna 620 and the one or more directional optical transceivers due to the use of the optical circulator 615. In other words, a bidirectional link consisting of two fibre strands (one for each direction) may be multiplexed onto a single strand of optical fibre using the optical circulator 615.

In other embodiments, millimeter wave transceivers may also be utilized to enhance operations of the optical base station (or transmitting device) and the autonomous wireless hotspot (or receiving device). In exemplary embodiments, millimeter waves may have wavelengths of 1 millimeter or range from 1 to 10 millimeters, although other wavelengths may be utilized. Millimeter wave beams may have a frequency band ranging from 30 to 300 Gigahertz. In exemplary embodiments, the millimeter wave band may be designated as an extremely high frequency band. In addition, in some cases, the term millimeter wave may also be shortened for ease of readability to mm-Wave.

Figure 7:
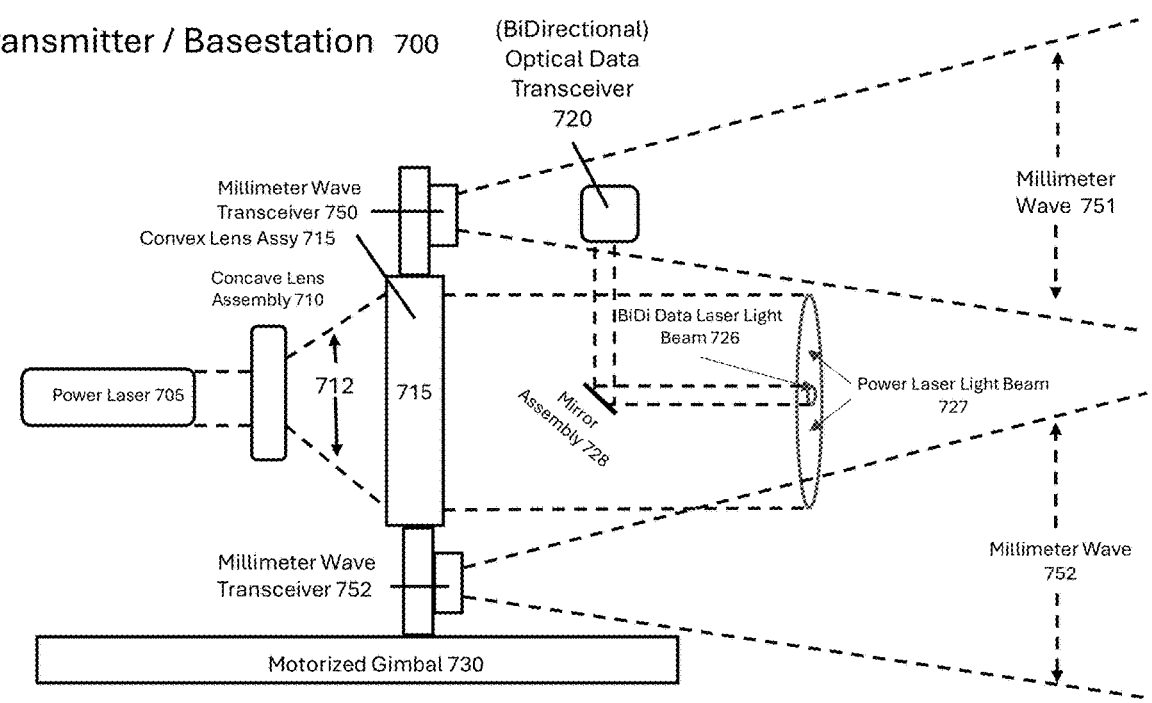
FIG. 7 illustrates a block diagram of a transmitting device transmitting a composite optical power, optical data and millimeter wave beam according to exemplary embodiments.

In exemplary embodiments, the optical base station may also include two or more millimeter wave transceivers and the autonomous wireless hotspots may also include two millimeter wave transceivers. In some embodiments, the two or more millimeter wave transceivers may not use the optical antennas in the optical base station and/or the autonomous wireless hotspots. In other embodiments, the two or more millimeter wave transceivers may utilize the antennas (e.g., optical antennas) in the optical base stations and autonomous wireless hotspot devices. In exemplary embodiments, the millimeter wave transceivers may generate mm-wave beams (that are self-aligned with the combined power and data laser light beams already being transmitted by the optical base station) by placing or positioning the two or more mm-wave transceivers on a structure, housing, plate or mechanical assembly that including one or both of the lens assemblies and/or the mirror assemblies of the optical base stations and/or the autonomous wireless hotspot devices. In exemplary embodiments, the millimeter wave transceivers may each generate a mm-wave beam (or mm-wave beams), that are self-aligned with the combined power and data laser light beam already being transmitted by the optical base station by placing or positioning the two or more mm-wave transceivers on a structure, housing, plate or mechanical assembly that including one or both of the lens assemblies and/or the mirror assemblies of the optical base stations and/or the autonomous wireless hotspot devices. In exemplary embodiments, the mm-wave transceivers (and thus the mm-wave beams) may be utilized to communicate or transmit backup or redundant data signals, which may act as a redundancy when an optical path is blocked for the data laser light beams, when the optical data transceiver (or data laser beams) fails or when the optical data transceiver is inoperable. In exemplary embodiments, the two or more mm-wave transceivers (and thus the mm-wave beam transmitted therefrom) may be utilized to communicate or transmit a backup or redundant data signal, which may act as a redundancy when an optical path is blocked for the data laser light beam, when the optical data transceiver (or the data laser beam) fails or when the optical data transceiver is inoperable. In exemplary embodiments, the mm-wave transceivers on the optical base station and/or the autonomous wireless hotspot may communicate with each other in order to perform a coarse alignment process. In these embodiments, the mm-wave transceivers in the optical base station or the autonomous wireless hotspot device may receive the mm-wave beams and the mm-wave transceivers or other components of the optical base station or autonomous wireless hotspot device may analyze a signal strength of the received mm-wave beams. If the mm-wave beam strength does not meet a threshold, the receiving device may communicate with the transmitting device to better align the transmitting device to generate, produce and/or communicate a stronger strength mm-wave beam. This may also be true if a single mm-wave is transmitted by each of the two or more mm-wave transceivers. In exemplary embodiments, the two or mm-wave transceivers may be utilized as a side channel for network management (e.g., the management of multiple systems including multiple base stations and the autonomous wireless hotspot devices). As mentioned above, the mm-wave wave beams may be self-aligned with the combined power and data laser light beams. In exemplary embodiments, the mm-wave beam may be self-aligned with the combined power and data laser light beam. In exemplary embodiments, having an optical base station with two or more mm-wave transceivers (and a power laser and an optical data transceiver) and an autonomous wireless hotspot with mm-wave transceivers may be ideal for a satellite to ground communication line because when clouds block laser light paths, the communication link between the optical base station and the autonomous wireless hotspot devices may continue to operate via the mm-wave beams generated by the mm-wave transceivers. FIG. 7 illustrates a transmitting device (optical base station) including mm-wave transceivers in accordance with embodiments. FIG. 8 illustrates a receiving device (e.g., an autonomous wireless hotspot) including mm-wave transceivers in accordance with embodiments.

Figure 9:
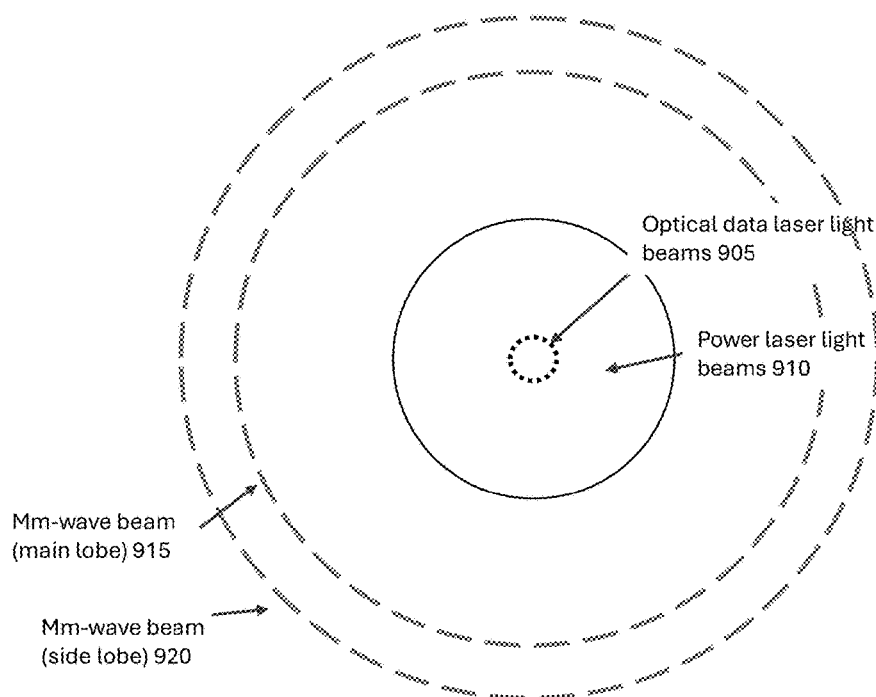
FIG. 9 illustrates a cross-section of a hybrid optical data, optical power and millimeter wave beam according to exemplary embodiments.

FIG. 7 illustrates a transmitting device (or optical base station) in accordance with embodiments. FIG. 7 does not illustrate the one or more antennas that are utilized to transmit the composite beams (e.g., the composite power laser light beams, the data laser light beams, and/or the mm-wave beams) that are part of the base station 700. As noted previously, only one composite power laser light beam, data laser light beam, power laser light beam, and/or mm-wave beam (for each mm-wave transceiver). The transmitting device (or optical base station) 700 of FIG. 7 includes many of the components and/or the features of the transmitting device (or optical base station) 400 of FIG. 4 with the addition of two or more mm-wave transceivers 750 and/or 752. In exemplary embodiments, the transmitting device or base station 700 may include two or more millimeter wave (mm-wave) transceivers 750 and 752, one or more power laser devices 705, one or more concave lens assemblies 710, one or more convex lens assemblies 715, one or more optical data transceivers 720, one or more mirror assemblies 728, and/or one or more motorized gimbals or gimbal assemblies 730. In exemplary embodiments, the similar components in FIG. 7 operate in similar fashion as the components in the optical base station of FIG. 4. The combination of the one or more concave lens assemblies 710 and the one or more convex lens assemblies 715 may form a Galilean beam expander in order to produce collimated power laser light beams (or a power laser light beam). The Galilean beam expander may expand the beam due to a sequence of the one or more concave lens assemblies 710 and the one or more convex lens assemblies 715 and an expansion ratio may depend on the lenses and the distances between them. The combined power and data laser light beams may include the power laser light beams 727 and the data laser light beams 726. In some embodiments, the combined power and data laser light beams may include the power laser light beam 727 and the data laser light beam 726. In exemplary embodiments, the two or more millimeter wave transceivers are positioned on top of (mm-wave transceiver 750) and below the (mm-wave transceiver 752) the convex lens assembly 715 on an assembly or surface that may be coupled and/or connected to the motorized gimbal assembly 730. In exemplary embodiments, this assembly, mount or surface may also be coupled and/or connected to the one or more concave lens assemblies 710 and/or the one or more mirror assemblies 728. This configuration and/or positioning may provide more coverage area for the generated mm-wave beams (or mm-wave beam generated by each of the mm-wave transceivers). FIG. 9 illustrates a cross-section of the power laser light beams, the data laser light beams and/or the millimeter wave beams in accordance with embodiments (or a data laser light beam, a power laser light beam and a millimeter wave beam (for each of the mm-wave transceivers). In FIG. 9, the three beams may be a single hybrid beam having three constituent components. In exemplary embodiments, as discussed above, the data laser light beams 905 may be a smaller diameter wave positioned in a center location of the power laser light beams 910. In exemplary embodiments, the data laser light beams and the power laser light beams 910 may be aligned due to positioning of the one or more mirror assemblies 728 and the one or more lens assemblies 710 and 715 in the optical base station. In exemplary embodiments, the millimeter wave beam main lobe 915 may be a larger beam and may encompass the power laser light beams 910 and the data laser light beams 905. Although the positioning is shown in FIG. 9 as the data laser light beams 905 and the power laser light beams 910 being in a center of the millimeter wave beams main lobe 915. However, in other embodiments, a relative position of the data laser light beams 905 and the power laser light beams 910 with respect to the millimeter wave beams may vary however, the positioning of the millimeter wave beams are fixed and/or aligned with the data laser light beams and/or the power laser light beams may be fixed due to positioning and/or locations in the optical base station and/or the wireless autonomous hotspot. In exemplary embodiments, the millimeter wave beams may include a side lobe 920. In exemplary embodiments, the millimeter wave side lobe 920 may have a larger diameter and may be positioned outside of the millimeter wave main lobe beams 915, as illustrated in FIG. 9.

In exemplary embodiments, as discussed above, the data laser light beam 905 may be a smaller diameter wave positioned in a center location of the power laser light beam 910. In exemplary embodiments, the data laser light beam and the power laser light beam 910 may be aligned due to positioning of the one or more mirror assemblies 728 and the one or more lens assemblies 710 and 715 in the optical base station. In exemplary embodiments, the millimeter wave beam main lobe 915 may be a larger beam and may encompass the power laser light beam 910 and the data laser light beam 905. Although the positioning is shown in FIG. 9 as the data laser light beam 905 and the power laser light beam 910 being in a center of the millimeter wave beam's main lobe 915. However, in other embodiments, a relative position of the data laser light beam 905 and the power laser light beam 910 with respect to the millimeter wave beam(s) may vary however, the positioning of the millimeter wave beam(s) are fixed and/or aligned with the data laser light beam and/or the power laser light beam may be fixed due to positioning and/or locations in the optical base station and/or the wireless autonomous hotspot. In exemplary embodiments, the millimeter wave beams may include a side lobe 920.

Returning to FIG. 7, in exemplary embodiments, one millimeter wave transceiver 750 of the two or more millimeter wave transceivers may transmit millimeter waves 751 (or a mm-wave beam) to one or more wireless autonomous hotspots. In exemplary embodiments, another millimeter wave transceiver 752 of the two or more millimeter wave transceivers may also transmit millimeter wave beams 753 (or a mm-wave beam) to the one or more wireless autonomous hotspots. By having two or more millimeter wave transceivers, a coverage area for the millimeter wave transceivers 750 and 752 of the optical base station 700 is a larger area in order to include the wireless autonomous hotspots. In exemplary embodiments, one or more data transceivers (e.g., wired or wireless data transceivers) in the optical base station 700 may be coupled to the two or more millimeter wave transceivers 750 and 752 and may provide backup analog or digital data for the optical base station 700. In other words, in this specific circumstance, the two or more millimeter wave transceivers 750 and 752 may be transmitting backup data (which is the same or similar to the data signals (or data signal) that are being transmitted by the one or more optical data transceivers 720) in case the one or more optical data transceivers fail, have line of sight with respect to the autonomous wireless hotspot devices compromised, or may have clouds between the optical base station 700 and the autonomous wireless hotspots. In addition to or alternatively to the transmission of data (or backup data), the two or more millimeter wave transceivers 750 and 752 may transmit alignment signals or alignment signal parameters to the autonomous wireless hotspot to provide a coarse alignment between the optical base station 700 and the one or more autonomous wireless hotspots. Coarse alignment of the optical base station 700 and the one or more autonomous wireless hotspots may operate as follows. The two or more millimeter wave transceivers 750 and 752 may transmit a plurality of millimeter wave beams (or a millimeter wave beam for each of the two or more millimeter wave transceivers 750 and 752) to one or more of the two or more millimeter wave transceivers 851 and 853 on the autonomous wireless hotspot devices 800. In exemplary embodiments, the millimeter wave transceivers 851 and/or 853 receive the plurality of the millimeter wave beams (or respectively receive a millimeter wave beam). In exemplary embodiments, the autonomous wireless hotspot 800 may receive the plurality of the millimeter wave beams and may analyze a signal strength of the received plurality of millimeter wave beams. In exemplary embodiments, if the signal strength of the received plurality of millimeter wave beams is less than a threshold signal strength, this means that there may be an issue with the alignment of the base station and the autonomous wireless hotspot devices and/or the millimeter wave transceivers on the base station and/or autonomous wireless hotspot device. In these exemplary embodiments, the autonomous wireless hotspot device may transmit alignment signal(s) or control signal(s) through the millimeter wave transceivers 851 or 853 or other wireless communication transceivers to the optical base station. In these exemplary embodiments, the optical base station 700 may receive the alignment signal(s) or control signal(s) and send the alignment or control signal(s) to the one or more gimbal assemblies 730 in the base station to align positioning of the optical base station, the lens assemblies 710 715, and/or the mirror assemblies 728. This may operate in reverse in that the two or more millimeter wave transceivers 851 and 853 of the autonomous wireless hotspots may transmit millimeter wave beams (or each transmit a millimeter wave beam) to the optical base station 700 and its two or more millimeter wave transceivers 750 and 752 (which may analyze the strength of the received millimeter wave beam(s) and generate control or alignment signal(s) if the signal strength is too low or below a threshold).

In exemplary embodiments, in addition to or alternatively to the transmission of backup data and/or alignment data, the two or more millimeter wave transceivers 750 and 752 may transmit network management signals and/or parameters. In other words, a network of optical base stations and/or autonomous wireless hotspots may be managed by local network computing devices and/or cloud computing devices and the two or more millimeter wave transceivers 750 752 may communicate various operating parameters and/or status parameters to the local network computing devices and/or cloud computing devices directly or through the one or more autonomous wireless hotspots 800. This listed functionality may allow the optical base station 700 to operate in a more efficient fashion and provide many additional capabilities.

FIG. 8 illustrates a block diagram of a receiving device or wireless autonomous hotspot according to exemplary embodiments. FIG. 8 does not illustrate the one or more optical antennas that are utilized to receive the composite beams (e.g., the composite power laser light beams, the data laser light beams, and/or the millimeter wave beams (mm-wave beams) that is part of the autonomous wireless hotspot 800. In exemplary embodiments, the wireless autonomous hotspot described herein with respect to FIG. 8 operates in a similar fashion to the receiving device or wireless autonomous hotspot described in FIG. 5. In exemplary embodiments, similar components in the FIG. 8 wireless autonomous hotspot 800 (e.g., the lens assemblies 815 and 820, the mirror assemblies 810, the optical data transceivers 805, the motorized gimbal 830 and/or the laser energy device, PV cell or device laser energy harvesting cell 825) may operate in a similar fashion as described with the similar or same components in FIG. 5. In addition, the autonomous wireless hotspot device 800 may receive the combined power and data laser light beams which includes the power laser light beams 801 and the data laser light beams 802 (or receive the combined power and data laser light beam which includes the power laser light beam 801 and the data laser light beam 802). In FIG. 8, although one wireless autonomous hotspot may be shown, this block diagram may apply to more than one wireless autonomous hotspots. In FIG. 8, the autonomous wireless hotspot 800 may include one or more mirror assemblies 810 to reflect the received data laser light beams 802 (of received data laser light beam) in the combined power and data laser light beams (or the combined power and data laser light beam) transmitted by the optical base station (and to reflect response optical data laser light beams (or optical data laser light beam) to the optical base station), one or more lens assemblies (e.g., convex lens assemblies 815 and/or concave lens assemblies 820 may receive and pass through the power laser lights beams 801 (or the power laser light beam 801) received from the optical base station to the laser energy device 825 (which may convert the power laser light beams (or the power laser light beam) into electrical power) and provide electrical power for the components of the laser energy device 825. As mentioned above, in exemplary embodiments, the convex lens assemblies 815 and the concave lens assemblies 820 may form a Galilean beam reducer (or expander) that provides collimated power laser light beams (or a power light beam) to the laser energy device 825 for conversion into electrical energy. In exemplary embodiments, one millimeter wave transceiver 851 may receive mm-wave beams (or a mm-wave beam) from the optical base station (not shown) and may transmit mm-wave beams 852 (or a mm-wave beam) to the optical base station (or other computing devices in an area around the autonomous wireless hotspot). In exemplary embodiments, another millimeter wave transceiver 853 may receive mm-waves (or a mm-wave beam) generated by millimeter wave transceivers 750 and 752 in the optical base station. In exemplary embodiments, another millimeter wave transceiver 853 may transmit or communicate multi-media wave beams 854 (or a mm-wave beam) to the optical base station or other computing devices in the area of the autonomous wireless hotspot 800.

In embodiments or situations where the millimeter wave transceivers 851 and 853 may be utilized to receive backup digital or analog data transmitted from the base station, the millimeter wave transceivers 851 and 853 may receive the millimeter wave backup data beams (or a millimeter wave backup data beam) and transfer the alignment signal(s) to other components in the autonomous wireless hotspot in order to extract backup data or parameters. As an illustrative example, these additional components may be amplifiers, mixers, filters, analog to digital converters and digital signal processors to convert the mm-wave backup data signal(s) into backup data (e.g., digital backup data). In exemplary embodiments, one or more processors or controllers in the autonomous wireless hotspot 800 may execute computer-readable instructions to process the backup data and may communicate or transfer the processed back data to one or more data transceivers located in the autonomous wireless hotspot 800. In exemplary embodiments, the process may also operate in reverse (where the millimeter wave transceivers 851 and 853 of the autonomous wireless hotspot devices 800 transmit backup data to the optical base station 800).

In embodiments or situations where the millimeter wave transceivers 851 and 853 may be utilized to perform coarse alignment between the autonomous wireless hotspot 800 and base station 700, the two or more millimeter wave transceivers 851 and 853 may receive the alignment signal(s) or parameters and transfer the alignment signal(s) to other components in the autonomous wireless hotspot in order to extract alignment data or parameters. As an illustrative example, these additional components may be amplifiers, mixers, filters, analog to digital converters and digital signal processors to convert the mm-wave alignment signal(s) into alignment data or parameters. In exemplary embodiments, one or more processors or controllers in the autonomous wireless hotspot 800 may execute computer-readable instructions to process the alignment data or parameters and may generate hotspot alignment signal(s) to the motorized gimbal 830 in order to better align or position the autonomous wireless hotspot 800 to the base station 700.

The systems and devices described herein may be utilized in indoor environments, hybrid environments and/or outdoor environments. In exemplary embodiments, the one or more optical base stations and the one or more autonomous wireless hotspot devices may be installed in indoor environments such as offices, manufacturing environments, retail stores, convention centers, banquet or conference facilities. In these embodiments, it is preferable that the one or more optical base stations and the one or more autonomous wireless hotspot devices have line of sight with each other in order for the combined power and data laser light beams to be transmitted between the one or more optical base stations and the one or more autonomous wireless hotspot devices. In these embodiments, the one or more optical base stations and/or the one or more autonomous wireless hotspot devices may be installed or attached to the ceiling or on walls or vertical surfaces so as to have good visibility with the opposite receiving device. In addition, by having the one or more optical base stations and the one or more autonomous wireless hotspot devices located or positioned high on vertical surfaces or on ceilings, safety may be increased because there is little chance that the combined power and laser light beams will be near occupants' eyes. In outdoor environments, it is preferable to install, locate or position the one or more optical base stations and the autonomous wireless hotspot devices so that there is good visibility and no objects between the groups of devices. This will improve the performance of the one or more optical base stations and the autonomous wireless hotspot devices and minimize interference with the combined power and laser light beams that are being transmitted between the one or more optical base stations and the autonomous wireless hotspot devices. Further, the one or more autonomous wireless hotspot devices do not have to be near power outlets because the autonomous wireless hotspot devices are self-power and thus self-sufficient.

In embodiments or situations where the millimeter wave transceivers or transmissions may be utilized to receive and/or transmit network management data or parameters, the two or more millimeter wave transceivers 851 and 853 may receive the network management millimeter wave beam(s) and/or transfer the received millimeter wave beam(s) to other components in the autonomous wireless hotspot 800 in order to process and/or extract the network management data, requests and/or parameters. These may be processed as discussed above with respect to the other embodiments or situations. In exemplary embodiments, one or more processors or controllers in the autonomous wireless hotspot 800 may communicate the received network management data and/or parameters to computing devices such as local network or cloud-computing devices which are monitoring network operations (e.g., a network of a plurality of base stations and/or autonomous wireless hotspots). In addition, the one or more processors or controllers of the autonomous wireless hotspot may also communicate or transfer status parameters and operating parameters of the autonomous wireless hotspot (and components therein) to the two or more millimeter wave transceivers 851 and 853 in embodiments where the autonomous wireless hotspots is feeding back status parameters and operating parameters to the base station 700 or to other local area computing devices and/or cloud computing devices.

Figure 10A:
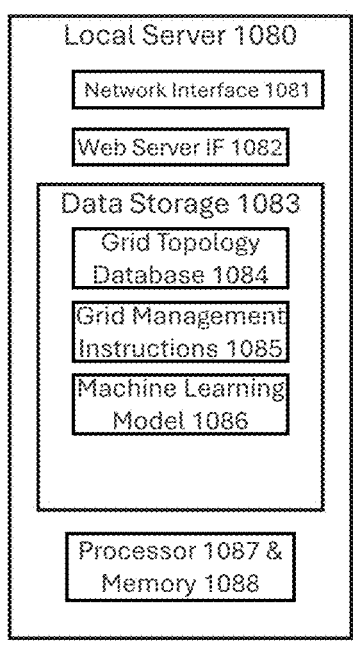
FIG. 10A illustrates a local server computing device according to exemplary embodiments.

FIG. 10A illustrates a local server computing device according to exemplary embodiments. In exemplary embodiments, the local or cloud server computing device 1080 may be communicatively coupled to one or more base stations or transmitting devices 305, one or more autonomous wireless hotspot devices or receiving devices 340, one or more free space optical communication links (or other optical communication links 330), and/or the global communications network 329 (e.g., the Internet). At a more detailed level, the local or cloud server computing device 1080 may be coupled to one or more power laser devices 310, one or more beam combiner devices 315, one or more base station optical antennas 320, one or more transmitter or base station optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365. In some embodiments, the local or cloud server computing device 1080 may also be communicatively coupled to one or more base station motorized gimbal assemblies 430, one or more hotspot motorized gimbal assemblies 530, two or more base station millimeter wave transceivers 750 and 752, and/or two or more hotspot millimeter wave transceivers 851 and 853. In some embodiments, the local or cloud server computing device 1080 may also be communicatively coupled and/or physically connected to one or more base station concave lens assemblies 410, one or more base station convex lens assemblies 415, one or more base station mirror assemblies 428, one or more hotpot mirror assemblies 510, one or more hotspot convex lens assemblies 515, and/or one or more hotspot concave lens assemblies 520. In exemplary embodiments, the local server computing device 1080 may include one or more local network interfaces 1081, one or more web server network interfaces 1082, one or more data storage devices 1083, one or more processors or controllers 1087 and one or more memory devices 1088.

In exemplary embodiments, the local server computing device 1080 may utilize the one or more local network interfaces 1081 to communicate with one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 (as well as the mirror and lens assemblies described above). In some implementations, the local network interface 1081 may utilize LAN wireless communication protocols such as WiFi or 802.11 wireless protocols or personal area network (PAN) wireless communication protocols to communicate with these power and data generating, receiving distribution devices and components. In some implementations, the local area network interface may be a low power wireless communication such as Matter or Thread. In exemplary embodiments, the local server computing device 1080 may be communicatively coupled to the web server computing device 1082 via a global communications network such as an Ethernet network and may utilize communication protocols such as TCP, UDP, IP, HTTP, IRC, BGP and ARP.

In exemplary embodiments, the one or more processors 1082 may execute computer-readable instructions stored in the one or more memory devices 1088 to control operations of the local server computing device 1080 and/or to communicate with the power and data transmission devices (e.g., base stations) and components and power and data receiving devices (e.g., autonomous wireless hotspot devices) mentioned and detailed above. In exemplary embodiments, the one or more data storage computing devices 1083 may also include an optical power and data topology database 1084, optical power and data grid management computer-readable instructions 1085 and/or a machine learning model 1086.

In exemplary embodiments, the optical power and data grid topology database 1084 may contain device information, parameters, operating conditions, location, and/or performance statistics for the one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 under control or in an area of the local server computing device 1080 (along with the mirror assemblies and lens assemblies described above). In exemplary embodiments, the one or more processors or controllers 1087 may execute the optical power and data grid management computer-readable instructions to communicate commands, instructions or signals to the power and data generation and distribution devices or stations and receiving devices in the optical power and data network. As illustrative examples, these optical power and data grid management instructions, commands or signals may request operating conditions and performance statistics of these different stations, devices and/or components, may request deactivation or activation of laser power converters and/or data transceivers, and/or may request that a power of the power laser device be adjusted. In exemplary embodiments, the local server computing device 1080 may receive the performance statistics or operation conditions of the optical power and data generation, receiving and distribution devices (and components) and may store this information in the optical power and data grid topology database 1084. In exemplary embodiments, computer-readable instructions executed by the one or more processors or controllers 1087 may utilize the machine learning model 1086 and analyze the information in the optical power and data grid topology database 1084 to understand trends and/or characteristics of the wireless optical power and data grid network and/or also to predict future performance statistics and operating conditions of the one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 in order to help the owner or user of the wireless optical power and data grid network to maintain peak and/or efficient performance. The local server computing device 1080 may handle this for all nodes, systems or stations in its area or network. As an illustrative example, computer-readable instructions executed by the one or more processors or controllers 1087 may utilize the machine learning model 1086 to analyze the information in the optical power and data grid topology database 1084 regarding performance statistics (e.g., optical power transmitted or optical data rate transmitted) for a number of optical base stations in the optical power and data grid for certain period of the day. By using the machine learning model 1086, the optical power and data grid management computer-readable instructions 1085 may determine that the optical base stations have a higher transmitted optical power and/or a higher optical data throughput during an evening timeframe and may provide this information to operators of the optical power and data grid and/or may communicate instructions, commands or signals to transmitting devices (e.g., such as laser power converters and/or optical data transceivers) to be activated during this timeframe. In other illustrative embodiments, by using the machine learning model 1086, the optical power and data grid management computer-readable instructions 1085 may identify that the combined optical power and data laser light beam (or laser light beams) are misaligned between specific optical base stations (transmitters) and/or wireless hotspot devices (receivers) several times during a week and/or that this is repetitive. In this illustration, the optical power and data grid management computer-readable instructions 1085 may then send commands, instructions and/or signals to operators of the optical power and data grid to investigate what conditions may be causing this misalignment in order to improve operation of the optical power and data grid network.

Figure 10B:
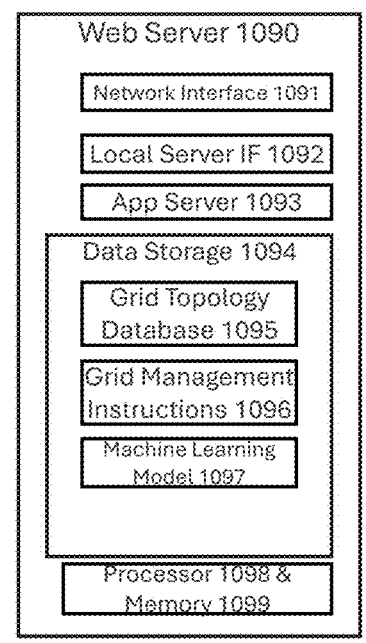
FIG. 10B illustrates a web server computing device according to exemplary embodiments.

FIG. 10B illustrates a web server computing device according to exemplary embodiments. In exemplary embodiments, the web server computing device 1090 may be communicatively coupled to one or more local server computing devices 1080 and may also be communicatively coupled or connected to one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 (and/or the mirror assemblies or lens assemblies described above). In exemplary embodiments, the web server computing device 1090 may include a global communications network interface 1091, a local server network interface 1092, an app server or an app server computing device 1093, one or more data storage devices 1094, one or more processors or controllers 1098 and one or more memory devices 1099. In exemplary embodiments, the web server computing device 1090 may utilize the one or more global network interfaces 1091 to communicate with the one or more local or cloud server computing devices 1080 (or other web server computing devices) and/or may also use the global network interface 1091 to communicate with the optical power and data transmitting, distribution and receiving devices and/or components listed above. In exemplary embodiments, the web server computing device 1090 may communicate with the local or cloud server computing devices via a local server interface 1092. In some implementations, the web server computing device 1090 may communicate via a global communications network such as Ethernet network and may utilize communication protocols such as TCP, UDP, IP, HTTP, IRC, BGP and ARP. In exemplary embodiments, the one or more processors 1098 may execute computer-readable instructions stored in the one or more memory devices 1099 to control operations of the web server computing device 1090, the one or more local server computing devices 1080 and/or to communicate with the wireless optical power generating, distribution and receiving devices (and/or components) mentioned above. In exemplary embodiments, the one or more data storage computing devices 1094 may also include an optical power and data grid topology database 1095, optical power and data grid management computer-readable instructions 1096 and/or a machine learning model 1097.

In exemplary embodiments, the optical power and data grid topology database 1095 may contain device information, parameters, operating conditions, location, and/or performance statistics for the one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 (and/or lens assemblies or mirror assemblies described above) under control or in an area of all of the local and cloud server computing devices 1080 that are communicating with or under the control of the web server computing device 1090. In exemplary embodiments, the one or more processors or controllers 1098 may execute the optical power and data grid management computer-readable instructions 1096 to communicate commands, instructions or signals to the one or more local server computing devices 1080 as well as optical power and data generation, distribution and receiving devices, components or stations in the wireless optical power and data grid network. These optical power and data grid management instructions, commands or signals may request operating conditions an performance statistics of these different stations, devices or components, may request network operating conditions and performance statistics for all devices in a local server computing device 1080's network, may request deactivation or activation of optical data transceivers and/or media converter devices (or laser power converters) throughout the optical power and data grid network under its control, and/or may request adjustments of parameters of optical power and data generating or transmitting, distribution and/or receiving devices, components and/or stations throughout the wireless optical power and data grid. In exemplary embodiments, the web server computing device 1090 may receive the performance statistics or operation conditions of the one or more local area networks associated with the local server computing device 1080, the one or more optical power and data generating, distribution and receiving devices or components and may store this information in the optical power and data grid topology database 1095. In exemplary embodiments, computer-readable instructions executed by the one or more processors or controllers 1098 may utilize the machine learning model 1097 and analyze the information in the optical power and data grid topology database 1095 to understand trends and/or characteristics of the optical power and data grid network and/or also to predict future performance statistics and operating conditions of the one or more optical power and data grid networks associated with the one or more local or cloud server computing devices; one or more base stations or transmitting devices 305, one or more autonomous wireless hotspot devices 340, one or more free space optical communication links (or other optical communication links 330), the global communications network 329, one or more power laser devices 310, one or more beam combiner devices 315, one or more base station optical antennas 320, one or more transmitter optical transceivers 325, one or more media converter devices 327, one or more switches or routers (switching or routing devices) 328, one or more wireless hotspot optical antennas 345, one or more beam divider devices 350, one or more laser power converters 355, one or more hotspot optical transceivers 360 and/or one or more wireless communication transceivers 365, the one or more base station motorized gimbal assemblies 430, one or more hotspot motorized gimbal assemblies 530, two or more base station millimeter wave transceivers 750 and 752, and/or two or more hotspot millimeter wave transceivers 851 and 853 (and/or lens assemblies or mirror assemblies) in order to help the owner or user of the optical power and data grid network to maintain peak and/or efficient performance. The web server computing device 1090 may handle this for all nodes, systems or stations that are under the control and/or in communication with the web server computing device. In exemplary embodiments, the app server 1093 may allow users, operators or owners to login to or to interface with the web server computing device 1090. The app server 1093 may allow these users, operators or owners to review the operating conditions, the performance statistics, the configurations and/or data received from all the components, systems, stations, local networks or nodes which are under the control of or in communication with the web server computing device 1090.

Figure 11:
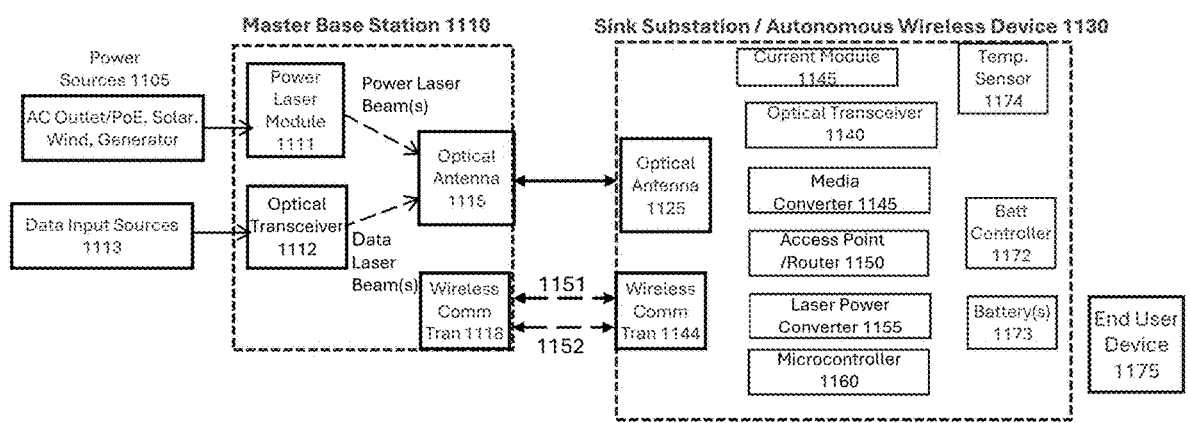
FIG. 11 illustrates a block diagram of a wireless optical power and data transmission, distribution and receiving system or grid including one or more master optical base stations and/or one or more autonomous wireless hotspot devices 1130 (or sink substations) according to exemplary embodiments.

In the specification and this application, the base station may be referred to as the transmitter and/or the transmitting device. In the specification and this application, the autonomous wireless hotspot device may also be referred to as a receiver and/or receiving device. FIG. 11 illustrates a block diagram of a wireless optical power and data transmission, distribution and receiving system or grid including one or more master optical base stations 1110 and/or one or more autonomous wireless hotspot devices 1130 (or sink substations) according to exemplary embodiments. In the embodiments illustrated in FIG. 11, wireless optical power and data transmission, distribution and receiving system or grid includes one or more power sources 1105, one or more data input devices or sources 1113, one or more master optical base stations 1110, one or more autonomous wireless hotspot devices 1130, and/or a plurality of end user devices 1175.

In exemplary embodiments, the one or more master optical base stations 1110 may be connected or coupled to one or more power sources 1105. In exemplary embodiments, the one or more master optical base stations 1110 may include one or more power laser modules 1111, one or more optical transceivers 1112 and/or one or more optical antennas 1115. In exemplary embodiments, the one or more power laser modules 1111 may be connected or coupled to the power sources 1005. In exemplary embodiments, the one or more power laser modules 1111 may be configured to receive or may receive the electrical power from the one or more power sources (or from a power converter in the one or more master base stations 1110) and the one or more power laser modules 1110 may be configured to or may generate a plurality of power laser light beams (or a power laser light beam) which is transmitted to one or more optical antennas 1115 in the one or more optical master base stations 1110.

In exemplary embodiments, one or more data input sources 1113 may be coupled to one or more optical data transceivers 1112. In exemplary embodiments, a data input source 1113 may transmit data signals or a data signal to one or more optical data transceivers 1112. In exemplary embodiments, the one or more optical data transceiver 1112 may receive the data signals or data signal, convert the data signals or data signal to a plurality of optical data laser light beams (or an optical data laser light beam) and transmit or communicate the plurality of optical data laser light beams (or the optical data laser light beam) to the one or more optical antennas 1115. In exemplary embodiments, the one or more optical antennas 1115 may receive the plurality of optical power laser light beams and the plurality of optical data laser light beams, may combine the plurality of optical power laser light beams and the plurality of optical data laser light beams and may transmit a plurality of combined power and data laser light beams. Thus, the one or more optical antennas 1115 may include a beam combining device. In embodiments, the one or more optical antennas 1115 may receive an optical power laser light beam and an optical data laser light beam, may combine the optical power laser light beam and an optical data laser light beam and may transmit a combined power and data laser light beam. The combining of the data laser light beam(s) and the power laser light beam may utilize systems and devices shown in FIGS. 3, 4, 5, 6, 7 and 8.

In exemplary embodiments, one or more optical distribution devices 1120 may be optically coupled between one or more master optical base stations 1110 and one or more autonomous wireless hotspot devices 1130. In some implementations, the one or more optical distribution devices may be one or more free space optical channels, one or more PVC pipes or tubing, one or more optical waveguides, or one or more optical fibers. Optical antennas in the one or more master optical base stations 1110 and one or more autonomous wireless hotspot devices 1130 may be optically coupled with each other utilizing the one or more optical distribution devices. In exemplary embodiments, a plurality of combined power and data laser light beams (or a combined power and data laser light beam) may be communicated through the one or more optical distribution devices 1120 to the one or more autonomous wireless hotspot devices 1130.

In exemplary embodiments, the one or more autonomous wireless hotspot devices 1130 may include one or more optical antennas 1125, one or more optical data transceivers 1140, one or more media converter devices 1145, one or more access points or routers 1150, one or more laser power converters 1155, one or more microcontrollers 1160 and/or one or more current monitor modules 1145. In exemplary embodiments, the one or more optical antennas 1125 may receive the combined power and data laser light beam and may divide the received laser light beam into a power laser light beam and a data laser light beam. In exemplary embodiments, the one or more optical antennas 1125 may receive the plurality of combined plurality of power and data laser light beams and may divide the received laser light beams into a plurality of power laser light beams and a plurality of data laser light beams. Thus, the one or more optical antennas 1125 in the hotspot device 1130 may include a beam combining device. In exemplary embodiments, the one or more laser power converters 1155 may include a laser energy harvesting cell configured to receive the power laser light beam and to convert the power laser light beam into hotspot or substation electrical power. In exemplary embodiments, the laser energy harvesting cell may include one or more resonant photovoltaic cavity devices. In embodiments, the one or more laser power converters 1155 may receive plurality of power laser light beams and convert the plurality of power laser light beams into hotspot or substation electrical power. In exemplary embodiments, the one or more laser power converters 1155 may transfer the substation electrical power to one or more end user devices 1175. The dividing of the combined laser light beams (or combined laser light beam) may utilize systems and devices shown in FIGS. 3, 4, 5, 6, 7 and 8. In exemplary embodiments, the generated substation electrical power may be transferred and/or provide to one or more battery charger controllers 1172. In exemplary embodiments, the one or more battery charger controllers 1172 may provide power and/or may charge the one or more batteries 1173 in the sink substation wireless hotspot device. In some implementations, the one or more battery charger controllers 1172 may provide electrical power to end user device(s) 1175, and/or other components of the wireless hotspot device.

In exemplary embodiments, the autonomous hotspot's optical antenna 1125 may receive the combined power and data laser light beams (or the combined power and data laser light beam) and direct the received combined power and data laser light beams (or the combined power and data laser light beam) to a beam divider (or splitter) in the one or more autonomous wireless hotspot devices 1130. In exemplary embodiments, the beam divider (or splitter) may separate the received combined power and data laser light beams (or combined power and light beam) into received data laser light beams and received power laser light beams (or a received power laser light beam and a received laser light beam).

In exemplary embodiments, the beam combiner or divider may direct or transmit the received data laser light beams (or data laser light beam) to one or more optical data transceivers 1140. In exemplary embodiments, the optical data transceiver 1140 may be a bidirectional optical data transceiver. In exemplary embodiments, the bidirectional optical data transceiver 1140 may communicate the received data laser light beams (or received data laser light beam) to one or more media converters 1145 to convert the received data laser light beams (or received data laser light beam) to electrical data signals or electrical data signal. In these implementations, the one or more media converters 1145 may transmit the electrical data signals (or electrical data signal) to one or more wireless access points or routers 1150, which may convert the electrical data signal(s) to wireless data signals. In some implementations, the wireless data signals may be received by one or more computing devices, IoT devices and/or sensor devices (or a plurality of end user devices 1175).

In exemplary embodiments, one or more master optical base stations 1110 may be communicatively coupled or connected to the one or more autonomous wireless hotspot devices (or sink substations) 1130 via one or more wireless communication links to transmit other information or data between the optical base stations (master stations) 1110 and the hotspot devices or sink substations) 1130. This is to allow the one or more autonomous wireless hotspot devices 1130 to provide feedback to the one or more master optical base stations 1110 and/or also to instruct the one or more master optical base stations 1110 when to activate or deactivate (or lessen the power of) the power laser module 1111 or the one or more optical transceivers 1112.

In exemplary embodiments, the one or more master base stations 1110 and the one or more autonomous wireless communication devices 1130 may also include one or more wireless communication transceivers 1118 (in base station 1110) and 1144 (in autonomous wireless hotspot device 1130). In embodiments, the computer-readable instructions are executable by one or more controllers or processors 1160 to monitor operational status of the one or more autonomous wireless hotspot devices 1130 and to communicate instructions or commands to the one or more wireless communication transceivers 1144 in the one or more autonomous wireless hotspot devices 1130 to be transmitted to the wireless communication transceivers 1118 in the one or more master base stations 1110 to control or adjust operation of the power laser modules 1111 and/or the one or more optical data transceivers 1112 in the one or more master base substations 1110. As illustrated in FIG. 11, two wireless communication links 1151 and 1152 may couple the one or more of the master optical base stations 1110 to the one or more autonomous wireless hotspot devices 1130. In some implementations, the two communication links 1151 or 1152 may be the same communication link but may be utilized at different times or may be different communication links operating utilizing different wireless communication protocols.

Described below are five different items, parameters or measurements that software executable by the one or more processors or controllers in the one or more autonomous wireless hotspot devices 1130 may be monitoring in order to determine a power level for the power laser light beams or power laser light beam (and/or electrical energy generated therefrom) by the one or more laser power converters 1155 or whether or not the power laser modules 1111 or devices need to be activated, deactivated and/or adjusted in the one or more master optical base stations 1110. These parameters, conditions and/or measurements may be monitored separately and/or may be monitored together in any number of combinations.

In exemplary embodiments, the one or more autonomous wireless hotspot devices 1130 may include a current monitor module 1145 that has one or more current sensors. In some implementations, the current monitor module 1145 including the one or more current sensor(s) may monitor current generated by the laser power converter(s) 1155. In some implementations, if the measured current is not within a specified range, the one or more controllers or processors 1160 in the autonomous wireless hotspot device(s) 1130 may communicate power and/or data laser adjustment, activation or deactivation commands or instructions to the wireless communication transceiver(s) 1144 in the autonomous wireless hotspot device(s) 1130. In some implementations, the wireless communication transceiver(s) 1144 may communicate the laser power adjustment, activation or deactivation commands or instructions to the wireless communication transceiver(s) 1118 in the master base station(s) 1110 and the one or more processors or controllers in the master base station(s) 1110 may execute computer-readable instructions to communicate the power and/or data laser adjustment, activation or deactivation commands or instructions to the power laser module 1111 in the master base station 1110. These commands may also be communicated to the one or more optical data transceiver(s) 1112 if parameters or measurements of the data laser light beam(s) need to be adjusted in the optical base station 1110.

In addition, in many implementations, if there are a large number of people or even one person in a same room (or indoor environment) as the one or more sink autonomous wireless hotspot devices 1130, it may not be safe to have the power laser beam(s) entering an environment or room with the autonomous wireless hotspot device(s) 1130. In these exemplary embodiments, the autonomous wireless hotspot device(s) 1130 may include a room occupancy sensor 1146 (or be coupled to a room occupancy sensor) to determine a number of individuals in the indoor area or environment including the autonomous wireless hotspot device(s) 1130. In some implementations, if the number of individuals or objects calculated by the room occupancy sensor(s) 1146 (or by software interfacing with the room occupancy sensor(s) is greater than a predetermined threshold, the one or more controllers or processors 1160 in the autonomous wireless hotspot device(s) 1130 may communicate the power and/or data laser deactivation commands or instructions to the wireless communication transceiver(s) 1144 in the autonomous wireless hotspot device(s) 1130, which may communicate the power and/or data laser deactivation commands or instructions to the wireless communication transceivers 1118 in the one or more master base stations 1110. In these exemplary embodiments, the one or more processors or controllers in the master base station(s) 1110 may execute computer-readable instructions to communicate the power and/or data laser activation or deactivation commands or instructions to the power laser module 1111 in the master base station(s) 1110. These commands may also be communicated to the one or more optical data transceiver(s) 1112.

In addition, in order to maximize security around in the indoor environment with the autonomous wireless hotspot device(s) 1130, the laser power module 1111 and/or the optical data transceiver(s) 1112 in the master base stations 1110 may not be activated during certain times of the day. As an illustrative example, the power laser module 1111 (and the power laser(s)) and/or the optical data transceiver(s) 1112 (and the data laser(s)) may not be activated from 7:00 am to 6:00 pm in order to maximize safety. In exemplary embodiments, the one or more controllers or processors in the master base station(s) 1110 or autonomous wireless hotspot device(s) 1130 may determine a time of day. In some implementation, if the determined time of day is during specified hours wherein individuals are located in an indoor area including the autonomous wireless hotspot device(s) 1130, the one or more controllers or processors in the master base station(s) 1110 may communicate commands or instructions to the power laser module 1111 and/or the optical data transceiver 1112 to ensure the power laser and/or the data laser are not turned on or activated during the specified timeframe. In some implementations, the specified hours may be the working hours for a building or for a company with offices in the room or indoor area.

Another condition that the wireless optical power and/or data network system or grid may monitor is a battery charge status measurement or battery charge parameter in the autonomous wireless hotspot device(s) 1130 to determine if the one or more batteries 1173 and/or one or more battery charge controllers 1172 in the autonomous wireless hotspot device(s) 1130 are low in charge or are overcharged. In exemplary embodiments, the one or more autonomous wireless hotspot device(s) 1130 may include one or more batteries 1173 and/or one or more battery charger controllers 1172. In exemplary embodiments, the one or more battery charger controllers 1172 may generate a battery charge status measurement or parameter for the one or more batteries 1173. In exemplary embodiments, the one or more battery controllers 1173 or charger may transmit the generated battery charge status measurement to the one or more controllers or processors 1160 in the autonomous wireless hotspot device(s) 1130. In some implementations, the computer-readable instructions executable by the one or more processors 1160 of the autonomous wireless hotspot device(s) 1130 may determine if the generated battery charge status measurements are greater than a predetermined threshold, the one or more processors or controllers 1160 may communicate the power and/or data laser adjustment, activation or deactivation commands or instructions to the wireless communication transceiver(s) in the autonomous wireless hotspot device(s) 1130. In exemplary embodiments, the wireless communication transceiver(s) 1144 in the autonomous wireless hotspot device(s) 1130 may utilize wireless link 1151 to communicate the power and/or data laser deactivation, activation or adjustment commands or instructions to the wireless communication transceiver(s) 1118 in the one or more master base station(s) 1110. In these exemplary embodiments, the one or more processors or controllers in the master base station(s) 1110 may execute computer-readable instructions to communicate the power and/or data laser adjustment, activation or deactivation commands or instructions to the power laser module(s) 1111 and/or optical data transceiver(s) 1112 in the master optical base station(s) 1110.

In exemplary embodiments, the one or more autonomous wireless hotspot devices 1130 may include one or more temperature sensors 1146 and/or a temperature module. In some implementations, the temperature module may include one or more temperature sensors 1146 that monitor temperature within the one or more laser power converters 1155 and/or other components within the autonomous wireless hotspot device(s) 1130. In some implementations, if the measured temperature is not within a specified range, the one or more controllers or processors 1160 in the autonomous wireless hotspot device(s) 1130 may communicate power and/or data laser adjustment, activation or deactivation commands or instructions to the wireless communication transceiver(s) 1144 in the autonomous wireless hotspot device(s) 1130. In some implementations, the wireless communication transceiver(s) may communicate the power and/or data laser adjustment, activation or deactivation commands or instructions to the wireless communication transceiver(s) 1118 in the master base station(s) and the one or more processors or controllers in the master base station(s) 1130 may execute computer-readable instructions to communicate the laser power adjustment, activation or deactivation commands or instructions to the power laser module 1111 in the master base station 1110. These commands may also be sent to the optical data transceiver(s) 1112 to adjust, activate and/or deactivate the generation of the data laser beam(s). Please note that temperature sensors or module and/or current sensors or modules may also be located in the master base station in order to monitor operational conditions of the master base station 1110.

Figure 12:
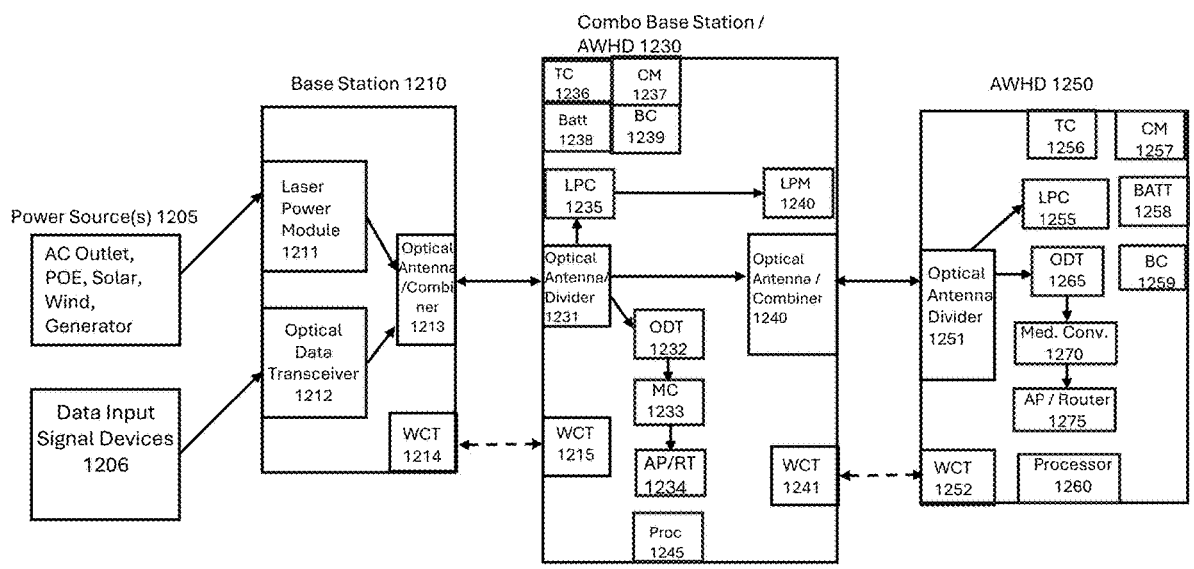
FIG. 12 or FIG. 12 illustrates a block diagram of an optical power and/or data generation, transmission and distribution system including a combination base station hotspot device according to exemplary embodiments; and FIG. 13
Figure 13:
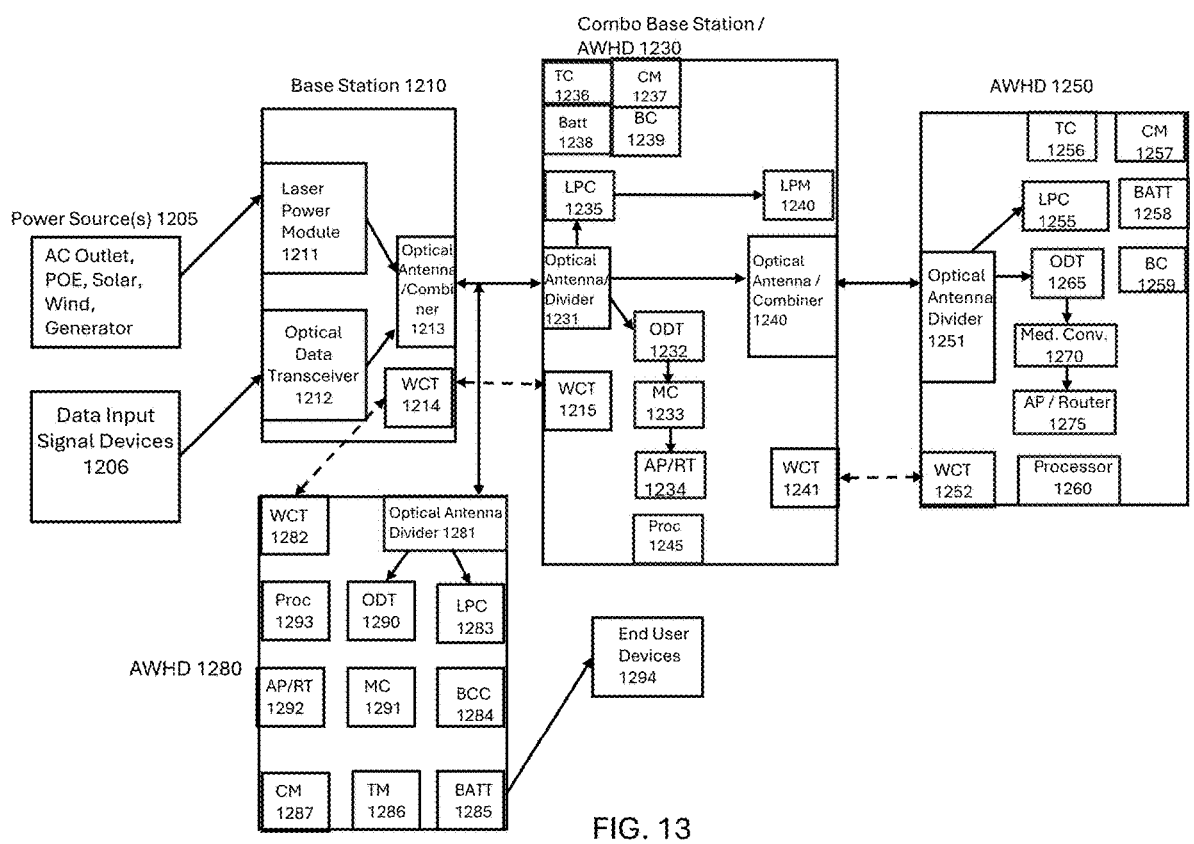
FIG. 13 illustrates a block diagram of an optical power and/or data generation, transmission and distribution system including a combination base station hotspot device as well as an autonomous wireless hotspot device 1280 connected to the base station 1210 according to exemplary embodiments

FIG. 12 illustrates a block diagram of an optical power and/or data generation, transmission and distribution system including a combination base station hotspot device according to exemplary embodiments. In the embodiment illustrated in FIG. 12, a combination base station and/or autonomous wireless hotspot device 1230 may be placed in between one or more optical power and data base station(s) 1210 and/or one or more autonomous wireless hotspot(s) and/or device(s) 1250. This is one of the different configurations that may be present in a large optical power and/or data generation, transmission and distribution systems. Reference number 1230 may be referred to as a combination base station hotspot device 1230. In some implementations, these combination base station hotspot devices may be referred to as master substations or intermediate substations. Although FIG. 12 illustrates only one optical power and/or data base station 1210, one combination optical base station and hotspot device 1230, and/or one autonomous wireless hotspot device 1250, the optical power and/or data generation, transmission and distribution system may include multiple nodes and/or configurations of these devices depends. As illustrative examples, a system may include a plurality of combination base station hotspot devices and each of the plurality of combination base station hotspot devices 1230 may be coupled to one or more autonomous wireless hotspot devices 1250. A very unique aspect of some of the embodiments illustrated in FIGS. 12 and 13 is that the components of the optical base station and the autonomous wireless hotspot device are both include in the combination base station hotspot device.

In exemplary embodiments, the optical power and/or data generation, transmission and distribution system 1200 may include one or more power source(s) 1205, one or more data signal input sources 1206, one or more optical power and data base station(s) 1210, one or more combination power and data base station hotspot device(s) 1230 and/ore one or more autonomous wireless hotspot device(s) 1250. As discussed previously in FIG. 11, the power sources 1205 may be an AC outlet, power over the Ethernet, solar, wind, and/or generator power. In exemplary embodiments, the data signal sources 1206 may be data electrical signals and/or data optical signals and may be received from computing devices, routers, switches and/or servers.

In exemplary embodiments, the one or more power and data base stations 1210 may be electrically and/or communicatively coupled to the power source(s) 1205 and/or to the one or more data source(s) 1206. In some implementations, the data source(s) may be coupled via wireless networks and/or wired networks. In exemplary embodiments, the laser power module 1211 in the power and data base station 1210 may receive power from the power source(s) 1205 and may generate a plurality of power laser light beams (or a power laser light beam) in response to the received power. In these implementations, the plurality of power laser light beams (or the power laser light beam) may be transmitted or communicated to the one or more optical antennas and combining device 1213 (which also may combine the plurality of power laser light beams (or power laser light beam) and the plurality of data laser light beams (or data laser light beam)). In exemplary embodiments, the data signal sources 1206 may communicate electrical data signals (or wireless data signals) to the one or more optical data transceiver(s) 1212. In exemplary embodiments, the one or more optical data transceiver(s) 1212 may convert the electrical or wireless data signals into a plurality of data laser light beams (or a data laser light beam) and may communicate the plurality of data laser light beams (or the data laser light beam) to the one or more optical antenna(s) and combining device(s) 1213. In exemplary embodiments, the one or more optical antenna(s) 1213 may include a beam combining device (as is discussed in FIGS. 4 and 7) and the one or more optical antennas 1213 may communicate a combined plurality of power and/or data laser light beams (or a combined power and data laser light beam) to the one or more combination base station wireless hotspot device(s) 1230.

In exemplary embodiments, one or more combined base station hotspot device(s) 1230 may include components that are in optical power and data base stations and/or power and data hotspot devices. In exemplary embodiments, the one or more combination base station hotspot device(s) 1230 may be communicatively and/or optically coupled to the one or more optical power and data base station(s) 1210 and/or one or more autonomous hotspot device(s) 1250. In exemplary embodiments, the one or more combination base station hotspot device(s) 1230 may include one or more optical antenna and dividing device(s) 1231, one or more laser power converter(s) 1235, one or more optical data transceiver(s) 1232, one or more media converter device(s) 1233, one or more access points/router device(s) 1234 and/or one or more processors or microcontrollers 1245. In exemplary embodiments, the one or more optical antenna and divider device(s) 1231 may receive the combined power and data laser light beam (or the plurality of combined power and data laser light beams) and may separate or divide out the power laser light beam and data laser light beam (from the combined laser light beam). In other embodiments, the plurality of power laser light beams and the plurality of data laser light beams may be divided out from the plurality of combination power data laser light beams. In exemplary embodiments, the power laser light beam (or plurality of power laser light beams) may be transmitted to the one or more laser power converters 1235, where the power laser light beams (or power laser light beam) may be converted into electrical signals and/or electrical power. In exemplary embodiments, the power laser light beams (or power laser light beam) may provide power to components of the combination base station hotspot device(s) 1230 so that no external power (e.g., AC outlet power) is required. In exemplary embodiments, the power laser light beams may provide power to the feedback modules (temperature sensor(s) 1236; current sensor(s) 1237; battery(s) 1238; and/or battery charge controller(s) 1239, the operation of which is described above with respect to FIG. 11 and may not be repeated here. In exemplary embodiments, one or more power converter device(s) (not shown) may generate different voltage levels for different components of the combination base station hotspot device(s) 1230. In exemplary embodiments, the electrical power signals may also be connected, transmitted or coupled to one or more laser power module(s) 1240. In exemplary embodiments, the one or more laser power module(s) 1240 may generate a power laser light beam (or a plurality of power laser light beams) and may communicate or transmit the power laser light beam (or the plurality of power laser light beams) to the one or more optical antenna combining device(s) 1246. In exemplary embodiments, the divided-out data laser light beam (or plurality of data laser light beams) received from the base station 1210 may be transmitted or directed from the optical antenna divider device 1231 to the one or more optical data transceiver(s) 1232. In exemplary embodiments, the one or more optical data transceiver(s) 1232 may be optically and/or communicatively coupled to the one or more media converter devices 1233. In exemplary embodiments, the optical data transceiver(s) 1232 may communicate the optical data laser light beams (or optical data laser light beam) to the one or more media converter device(s) 1233, which may convert the optical data laser light beams (or optical data laser light beam) into data electrical signal(s). In exemplary embodiments, the one or more media converter device(s) 1233 may communicate the data electrical signal(s) to the one or more access points router(s) 1234, which may generate wireless data communication signal(s) to an area around the access point router(s) based on and/or in response to the data electrical signal(s). In exemplary embodiments, the one or more optical data transceiver(s) 1232 may also communicate out the separated data light beam (or separated plurality of data laser light beams) to the one or more optical antenna combining device(s) 1246.

In exemplary embodiments, the optical antenna combining device(s) 1246 may combine the power laser light beam (or plurality of power laser light beams) with the data laser light beam (or plurality of data laser light beams) to form a combined power data laser light beam (or plurality of combined power data laser light beams) which may be referred to as an additional combined power and data laser light beam (or additional plurality of combined power and data laser light beams). This is what may be transmitted from the combination base station hotspot device. In exemplary embodiments, the components in the base station 1210 may be referred to as first devices or beams (e.g., a first optical data transceiver (and a first data laser light beam(s), a first power laser device (and a first power laser light beam(s)), a first beam combining device, and a first optical antenna. In embodiments, component in the combination base station hotspot devices 1230 may be referred to as second devices or second laser light beams or additional laser light beams. As illustrative examples, the combination base station hotspot device 1230 may be referred to as a second optical antenna device, a second optical data transceiver, a second optical data transceiver, a second beam combining device, a second power laser device and/or an additional optical antenna. Please note that the additional optical antenna 1240 may be physically the same as the second optical antenna. Please also note that although optical antenna combining device 1213, optical antenna divider device 1231, optical antenna combining device 1240, and optical antenna divider device 1251 are illustrated as one device in a block diagram, physically they may also be separate physical devices. Please also note that hotspot devices are first introduced in the combination base station hotspot device and thus, the first optical beam dividing device, the first power laser converter and the first access point or router are labeled as such. In exemplary embodiments, the optical antenna combining device 1240 may receive additional data laser light beam(s) and additional power laser light beam(s) and generate a combined additional laser light beam.

In exemplary embodiments, the one or more combination optical power and data base station hotspot devices 1230 may include feedback modules including one or more temperature sensors 1236, one or more current sensors 1237 in a current module, one or more batteries 1238 or one or more battery controller(s) (or battery charge controller) 1239s, and one or more wireless communication transceiver(s) 1215 and 1241. In exemplary embodiments, the one or more combination base station wireless hotspot device(s) 1230 may include one or more wireless communication transceivers 1241, one or more laser power modules 1240, and one or more optical antenna combining devices 1246. In exemplary embodiments, the feedback modules identified above and/or the wireless communication transceivers 1215 may operate in a similar fashion as described above with respect to FIG. 11 and the one or more wireless communication transceivers 1215 may communicate with the one or more wireless communication transceivers 1214 in the optical power and data base station(s) 1210. Accordingly, their operation may not be repeated here. Similarly, the one or more wireless communication transceivers 1241 in the combination base station hotspot device(s) 1230 may communicate with the one or more wireless communication transceiver(s) 1252 in the one or more autonomous wireless hotspot device(s) 1250 in order for the different feedback modules to provide feedback to the combination base station hotspot device(s) 1230 (e.g., the laser power module 1240). In exemplary embodiments, the combination base station hotspot device(s) 1230 may be located in one physical device. In other embodiments, the different combination and/or elements of the combination base station hotspot device(s) 1230 may be located in multiple physical hardware devices.

In exemplary embodiments, the one or more autonomous wireless hotspot device(s) 1250 may receive the additional combined power and data laser light beams (or the additional combined power and data laser light beam) from the combination bate station hotspot device 1230 at the hotspot optical antenna dividing device 1251. In exemplary embodiments, the autonomous wireless hotspot device 1240 may generate electrical power from the received additional power laser light beams and may generate wireless data signals based on the received additional optical data laser light beams. In addition, the one or more autonomous wireless hotspot device(s) 1250 may also provide power to end user devices 1270. In exemplary embodiments, the wireless hotspot device(s) 1250 may not need a cable to be powered (in other words it may be powered by the power laser light beam).

In exemplary embodiments, the autonomous wireless hotspot device(s) 1250 may include one or more hotspot optical antenna divider devices 1251, one or more hotspot laser power converters 1255, one or more hotspot optical data transceivers 1265, one or more hotspot media converter devices 1270, one or more hotspot access point/routers 1275, one or more processors 1260 and/or one or more wireless communication transceivers 1252. In exemplary embodiments, the optical antenna divider device(s) 1251 may separate or divide out the additional power laser light beams (or additional power laser light beam) from the additional combined power and data laser beams (or the additional combined power and data laser light beam) and may communicate, transmit or transfer the separate additional power laser beams (or additional power laser beam) to the one or more laser power converter(s) 1255. In these embodiments, the separated out power laser light beam in the hotspot device 1250 may be referred to as the hotspot power laser light beam and the separated data laser light beam may be referred to as the hotspot data laser light beam. In exemplary embodiments, the one or more laser power converter(s) 1255 may convert the hotspot power laser beams (or power laser light beam) into additional or hotspot power electrical signals and the additional or hotspot electrical signals may provide power to components and subsystems of the one or more wireless hotspot devices 1250 including, but not limited to the feedback modules (e.g., the temperature module 1256, the current module 1257, the battery charger controller 1249 and/or the one or more batteries 1258). The operation of these modules in the autonomous wireless hotspot device 1250 is similar to the discussion of these modules in FIG. 11 and will not be repeated here. In exemplary embodiments, the divided out hotspot data laser light beams (or data laser light beam) may be transmitted or directed from the optical antenna divider device 1251 to the one or more optical data transceiver(s) 1265. In exemplary embodiments, the optical data transceiver(s) 1265 may communicate the additional or hotspot optical data laser light beam(s) to the one or more media converter device(s) 1270, which may convert the additional data laser light beams (or additional laser light beam) into additional data electrical signal(s). In exemplary embodiments, the one or more media converter device(s) 1270 may communicate the additional or hotspot data electrical signal(s) to the one or more access points router(s) 1275, which may generate wireless data communication signal(s) to an area around the access point router(s) based on the additional data electrical signal(s). In some embodiments, the one or more access points routers may utilize one or more wireless communication transceivers to transmit the wireless data communication signal(s). Since the autonomous wireless hotspot device 1250 is the third device, the optical antenna may be referred to as the third optical antenna. Other components of the autonomous wireless hotspot device 1250 may be referred to second devices (e.g., a second optical beam dividing device and a second laser power converter, a second media converter device, or a second access point router) or third devices (e.g., a third optical data transceiver).

In exemplary embodiments, the one or more autonomous wireless hotspot device(s) 1250 may also include feedback devices including but not limited one or more temperature sensor(s) 1256, one or more current sensors 1257 in a current monitoring module 1257, one or more batteries 1258, or one or more battery charge controllers 1259, which operate in a same fashion as described in FIG. 11 and will not be repeated here. In In exemplary embodiments, the system described in FIGS. 2-9 above may be utilized in an Optical Power Distribution system. More specifically, the description of the operation and/or placement of the one or more convex lens assemblies, the one or more concave lens assemblies, the motorized gimbal assemblies, and the one or more mirror assemblies in both the optical base station and/or the autonomous wireless hotspot device in FIGS. 4, 5, 7 and 8 applies to and can be utilized in the embodiments described in FIGS. 11, 12, and 13. Further, the operation and description of the two or more millimeter wave transceivers in FIGS. 7 and 8 applies and can be utilized in the embodiments in FIGS. 11, 12 and 13.

FIG. 13 may have autonomous hotspot devices also connected to the base station and the combination device may also power end user devices. FIG. 13 illustrates a block diagram of an optical power and/or data generation, transmission and distribution system including a combination base station hotspot device as well as an autonomous wireless hotspot device 1280 connected to the base station 1210 according to exemplary embodiments. In exemplary embodiments, the autonomous wireless hotspot device 1280 may include one or more wireless communication transceivers 1282, one or more optical antenna and divider device 1281, one or more processors or controllers 1293, one or more optical data transceivers 1290, one or more laser power converters 1283, one or more access point or routing devices, one or more media converters 1291, one or more battery charge controllers 1284, one or more current modules or monitors 1287, one or more batteries 1285 and/or one or more temperature modules or monitors 1286. In FIG. 13, an autonomous wireless hotspot device 1280 may be communicatively coupled and/or connected to the base station 1210 in a configuration that also includes the combined base station hotspot device 1230. This shows that many different configurations are possible in the optical power and data distribution, transmitting and receiving system 1300. Although only one hotspot device 1280 is shown in FIG. 13 connected or coupled to the base station 1210, multiple or a plurality of autonomous wireless hotspot devices 1280 may be coupled or connected to the base station 1210. Similarly, while only one autonomous wireless hotspot device 1250 is shown coupled and/or connected to the combination base station hotspot device 1230, multiple autonomous wireless hotspot devices 1250 may be connected and/or coupled to the combination base station hotspot device 1230. Further in some implementations, multiple combination base station hotspot devices 1230 may be coupled and/or connected to the one or more base stations 1210.

In exemplary embodiments, one or more optical distribution devices (not shown) may be optically coupled between one or more master optical base stations 1210 and one or more autonomous wireless hotspot devices 1280. In some implementations, the one or more optical distribution devices may be one or more free space optical channels, one or more PVC pipes or tubing, one or more optical waveguides, or one or more optical fibers. Optical antennas 1230 and 1281 in the one or more master optical base stations 1210 and one or more autonomous wireless hotspot devices 1280 may be optically coupled with each other utilizing the one or more optical distribution devices. In exemplary embodiments, a plurality of combined power and data laser light beams (or a combined power and data laser light beam) may be communicated through the one or more optical distribution devices to the one or more autonomous wireless hotspot devices 1280 (as shown in FIG. 13).

In exemplary embodiments, the one or more autonomous wireless hotspot devices 1280 may include one or more optical antennas 1281, one or more optical data transceivers 1290, one or more media converter devices 1291, one or more access points or routers 1292, one or more laser power converters 1283, one or more microcontrollers 1293, one or more temperature modules 1286, one or more batteries 1285, one or more battery charge controllers 1283, one or more wireless communication transceivers 1282, and/or one or more current monitor modules 1287. In exemplary embodiments, the one or more optical antennas divider devices 1281 may receive the combined power and data laser light beam and may divide the combined beam into the received laser light beam into a power laser light beam and a data laser light beam. In exemplary embodiments, the one or more optical antennas 1281 may receive the plurality of combined plurality of power and data laser light beams and may divide the received laser light beams into a plurality of power laser light beams and a plurality of data laser light beams. In exemplary embodiments, the one or more laser power converters 1283 may include a laser energy harvesting cell configured to receive the power laser light beam and to convert the power laser light beam into hotspot or substation electrical power. In exemplary embodiments, the laser energy harvesting cell may include one or more resonant photovoltaic cavity devices. In embodiments, the one or more laser power converters 1283 may receive plurality of power laser light beams (or the power laser light beam) and convert the plurality of power laser light beams (or the power laser light beam) into hotspot or substation electrical power. In exemplary embodiments, the one or more laser power converters 1283 may transfer the substation electrical power to one or more end user devices 1294. The dividing of the combined power and data laser light beams (or combined power and data laser light beam) may utilize systems and devices shown in FIGS. 4, 5, 6, 7 and 8. In exemplary embodiment, the generated substation electrical power may be transferred and/or provide to one or more battery charger controllers 1284. In exemplary embodiments, the one or more battery charger controllers 1284 may provide power and/or may charge the one or more batteries 1285 in the autonomous wireless hotspot device 1280. In some implementations, the one or more battery charger controllers 1284 may provide electrical power to end user device(s) 1294, and/or other components of the wireless hotspot devices 1280.

In exemplary embodiments, the autonomous hotspot's optical antenna divider device 1281 may receive the combined power and data laser light beams (or the combined power and data laser light beam) and direct the received combined power and data laser light beams (or the combined power and data laser light beam) to a beam divider (or splitter) in the one or more autonomous wireless hotspot devices 1280. In exemplary embodiments, the beam divider (or splitter) may separate the received combined power and data laser light beams (or combined power and light beam) into received data laser light beams and received power laser light beams (or a received power laser light beam and a received laser light beam).

In exemplary embodiments, the beam combiner or divider may direct or transmit the received data laser light beams (or received data laser light beam) to one or more optical data transceivers 1290. In exemplary embodiments, the optical data transceiver 1290 may be a bidirectional optical data transceiver. In exemplary embodiments, the bidirectional optical data transceiver 1290 may communicate the received data laser light beams (or received data laser light beam) to one or more media converters 1291 to convert the received data laser light beams (or received data laser light beam) to electrical data signals or electrical data signal. In these implementations, the one or more media converters 1291 may transmit the electrical data signals (or electrical data signal) to one or more wireless access points or routers 1292, which may convert the electrical data signal(s) to wireless data signals. In some implementations, the wireless data signals may be received by one or more computing devices, IoT devices and/or sensor devices (or a plurality of end user devices 1294).

In exemplary embodiments, one or more master optical base stations 1210 may be communicatively coupled or connected to the one or more autonomous wireless hotspot devices (or sink substations) 1280 via one or more wireless communication links to transmit other information or data between the optical base stations (master stations) 1210 and the hotspot devices or sink substations) 1280. This is to allow the one or more autonomous wireless hotspot devices 1280 to provide feedback to the one or more master optical base stations 1210 and/or also to instruct the one or more master optical base stations 1280 when to activate or deactivate (or lessen the power of) the power laser module or laser power converter 1283 or the one or more optical transceivers 1290.

In exemplary embodiments, the one or more master base stations 1210 and the one or more autonomous wireless communication devices 1280 may also include one or more wireless communication transceivers 1214 (in base station 1210) and 1282 (in autonomous wireless hotspot device 1280). In embodiments, the computer-readable instructions are executable by one or more controllers or processors 1293 to monitor operational status of the one or more autonomous wireless hotspot devices 1280 and to communicate instructions or commands to the one or more wireless communication transceivers 1282 in the one or more autonomous wireless hotspot devices 1280 to be transmitted to the wireless communication transceivers 1214 in the one or more master base stations 1210 to control or adjust operation of the power laser modules 1211 and/or the one or more optical data transceivers 1212 in the one or more master base substations 1210.

The embodiments discussed and detailed in FIGS. 12 and 13 also can utilized the feedback techniques discussed in FIG. 11. These techniques would utilize feedback received either in the device itself and/or received via the one or more wireless communication transceivers located in the optical base station(s) (e.g., base station 1210 in FIGS. 12 and 13), the combination base station hotspot device(s) (e.g., 1230 in FIGS. 12 and 13), the autonomous wireless hotspot device(s) (1270 in FIGS. 12 and 13) connected or coupled to the combination base station hotspot device(s) (1230 in FIGS. 12 and 13) or the autonomous wireless hotspot device(s) (1280 in FIG. 13). These feedback techniques include receiving feedback about temperature (from the temperature sensors or module 1286), about power or current (from the current module or sensors 1287), about battery charge status (from the battery charger controller 1284 or battery(s) 1285), feedback about room occupancy and/or feedback about time of day (as discussed above). In exemplary embodiments, the autonomous wireless hotspot device 1280 may also be connected and/or coupled to a plurality of end user devices 1294 (e.g., such as mobile communication devices, iOT sensors, mobile computing devices, etc.).

In exemplary embodiments, the one or more laser power converters discussed in FIGS. 3, 5, 8, 11, 12, and 13 may match operating frequencies or wavelengths (or an operating frequency or wavelength) of the laser device or subsystem (within the power laser modules or laser devices described in FIGS. 3-13) with that of a resonant cavity photovoltaic device or subsystem present in the laser power converters. An optimal or maximum power may be obtained because a peak of the resonant cavity photovoltaic device subsystem frequency or wavelength spectrum (and thus the power generated therefrom) is at a same point as a power laser frequency or wavelength from a power laser module or laser device. In exemplary embodiments, a resonant cavity photovoltaic device subsystem frequency or wavelength spectrum (and thus generated power) has its largest value at a same or similar point to the power laser module or laser device laser wavelength or frequency. In this alignment, the resonant cavity photovoltaic device of the laser power converters discussed herein may generate maximum power. This is contrasted to an embodiment where the laser frequency of the power laser module is offset from a peak of the resonant cavity photovoltaic device or subsystem frequency or wavelength spectrum, and electrical power generation is not maximized or optimized While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

The invention claimed is:

1. An optical wireless power and data delivery system, comprising:
   an optical base station, the optical base station including:
      a first optical data transceiver configured to transmit a data laser light beam;
      a power laser device configured to transmit a power laser light beam;
      a beam combining device configured to receive the power laser beam and the data laser light beam and generate a combined power and data laser light beam; and
      a first optical antenna to receive the combined power and data laser light beam; and transmit or pass through the combined power and data laser light beam through one or more free space optical channels or communication links; and
   an autonomous wireless hotspot device, the autonomous wireless hotspot device including:
      a second optical antenna configured to receive the combined data and power laser light beam from the optical base station via the one or more free space optical channels or communication links;
      an optical beam dividing device configured to separate out a hotspot data laser light beam and a hotspot power laser light beam from the combined power and data laser light beam;
      a second optical data transceiver configured to receive the hotspot data laser light beam from the optical beam dividing device and to transmit the hotspot data laser light beam;
      a second media converter device configured to convert the hotspot data laser light beam into analog or digital data signals;
      one or more wireless transceivers configured to receive the converted analog or digital data signals and to convert the converted analog or digital data signals to wireless data signals and to transmit the wireless data signals to an area around the autonomous wireless hotspot device; and
      one or more laser power converters configured to receive the hotspot power laser light beam and to convert the hotspot power laser light beam into electrical energy, the one or more laser power converters including a resonant cavity photovoltaic device, wherein the electrical energy provides power to components of the autonomous wireless hotspot device without any cable provided electrical power.

2. The optical wireless power and data delivery system of claim 1, wherein the beam combining device of the optical base station includes one or more concave lens assemblies, one or more convex lens assemblies, and one or more mirror assemblies,
   the one or more concave lens assemblies configured to receive the power laser light beam and create a divergent power laser light beam; and
   the one or more convex lens assemblies to receive the divergent power laser light beam from the one or more concave lens assemblies and to generate an aligned power laser light beam to be directed to the first optical antenna.

3. The optical wireless power and data delivery system of claim 2,
   wherein the one or more mirror assemblies are configured to reflect the data laser light beam and direct the reflected data laser light beam to the first optical antenna, wherein the first optical antenna receives the reflected data laser light beam and the aligned power laser light beam to create the combined power and data laser light beam.

4. The optical wireless power and data delivery system of claim 3, wherein the one or more mirror assemblies are positioned in a center of an optical path of the aligned power laser light beam and are aligned with the aligned power laser light beam.

5. The optical power and data delivery system of claim 4, wherein the one or more mirror assemblies block a center area of the aligned power laser light beam and the combined power and data laser light beam.

6. The optical power and data delivery system of claim 3, further including a motorized gimbal, the motorized gimbal coupled to the beam combining device or the first optical antenna to align the combined power and data laser light beam with the second optical antenna of the autonomous wireless hotspot device in response to a feedback or alignment signal generated by the autonomous wireless hotspot device.

7. The optical power and data delivery system of claim 1, the optical base station further comprising two or more millimeter wave transceivers, the two or more millimeter wave transceivers configured to generate millimeter wave beams that are transmitted as part of the combined power and data laser light beam to the autonomous wireless hotspot device.

8. An optical wireless power and data delivery system, comprising:
- an optical base station, the optical base station including:
  - a first optical data transceiver configured to transmit a first data laser light beam;
  - a first power laser device configured to transmit a first power laser light beam;
  - a first beam combining device configured to receive the first power laser beam and the first data laser light beam and generate a combined power and data laser light beam; and
  - a first optical antenna to receive the combined power and data laser light beam; and transmit or pass through the combined power and data laser light beam through one or more free space optical channels or communication links; and
- a combination base station hotspot device, including:
- a second optical antenna device to receive the combined power and data laser light beam;
- a first optical beam dividing device configured to separate out a second power laser light beam and a second data laser light beam from the combined power and data laser light beam;
- a second optical data transceiver to receive the second data laser light beam;
- a first access point or router configured to transmit wireless data signals to an area around the autonomous wireless hotspot device based at least in part on the second data laser light beam;
- a first laser power converter configured to receive the second power laser light beam and to convert the second power laser light beam into electrical energy, wherein the electrical energy provides power to components of the combination base station hotspot device without any cable provided electrical power;
- a second power laser device configured to receive electrical energy or electrical power from the first laser power converter and to generate and transmit an additional power laser light beam;
- wherein the second optical data transceiver is configured to generate an additional data laser light beam;
- a second beam combining device configured to receive the additional power laser light beam and the additional data laser light beam and generate a combined additional power and data laser light beam; and
- an additional optical antenna, the additional optical antenna to receive and transmit the combined additional power and data laser light beam.

9. The system of claim 8, further including:
- an autonomous wireless hotspot device, the autonomous wireless hotspot device including:
  - a third optical antenna configured to receive the combined additional data and power laser light beam from the combination base station hotspot device;
  - a second optical beam dividing device configured to separate out a hotspot data laser light beam and a hotspot power laser light beam from the combined additional power and data laser light beam;
  - a second laser power converter configured to receive the hotspot power laser light beam and to convert the hotspot power laser light beam into electrical energy, wherein the electrical energy provides power to components of the autonomous wireless hotspot device without any cable provided electrical power; and
  - a third optical data transceiver configured to receive the hotspot data laser light beam from the second optical beam dividing device and to transmit the hotspot data laser light beam.

10. The system of claim 9, further including:
- a second media converter device configured to convert the hotspot data laser light beam into analog or digital data signals; and
- one or more wireless transceivers configured to receive the converted analog or digital data signals and to convert the converted analog or digital data signals to wireless data signals and to transmit the wireless data signals to an area around the autonomous wireless hotspot device.

11. The system of claim 8, the first beam combining device of the optical base station including one or more concave lens assemblies, one or more convex lens assemblies, and one or more mirror assemblies,
- the one or more concave lens assemblies configured to receive the first power laser light beam and create a divergent first power laser light beam;
- the one or more convex lens assemblies to receive the divergent first power laser light beam from the one or more concave lens assemblies and to generate an aligned first power laser light beam to be directed to the first optical antenna.

12. The system of claim 11, the one or more mirror assemblies configured to reflect the first data laser light beam and direct the reflected first data laser light beam to the first optical antenna, wherein the first optical antenna receives the reflected first data laser light beam and the received aligned first power laser light beam to create the combined power and data laser light beam.

13. The system of claim 12, wherein the one or more mirror assemblies are positioned in a center of an optical path of the aligned first power laser light beam and are aligned with the aligned first power laser light beam and wherein the one or more mirror assemblies block a center area of the aligned power laser light beam and the combined power and data laser light beam.

14. The system of claim 8, the optical base station further comprising two or more millimeter wave transceivers, the two or more millimeter wave transceivers configured to generate millimeter wave beams that are transmitted as part of the combined power and data laser light beam to the combination base station hotspot device.

15. The system of claim 13, further including a motorized gimbal, the motorized gimbal coupled to the first beam combining device or the first optical antenna to align the combined power and data laser light beam with the second optical antenna of the combination base station hotspot device in response to a feedback or alignment signal generated by the combination base station hotspot device.

16. The system of claim 8, where the first optical beam dividing device includes one or more combination mirror assemblies, one or more combination convex assemblies and one or more combination concave lens assemblies, the one or more mirror assemblies configured to separate the second data laser light beam from the combined power and data laser light beam and reflect the second data laser light beam to the second optical data transceiver; and
- the one or more combination convex lens assemblies to receive a second power laser light beam of the combined power and laser light beams from the second optical antenna and to generate a converging power laser light beam; and one or more combination concave lens assemblies to receive the converging second power laser light beam and to direct the received second power laser light beam to the one or more laser energy devices, the one or more laser energy device configured to generate electrical energy from the plurality of received power laser light beams.

17. An optical power and data transmission system for transmitting a combined power and data laser light beam, comprising:
one or more transmitter concave lens assemblies, the one or more transmitter concave lens assemblies configured to receive a power laser light beam and to transmit a divergent power laser light beam;
one or more transmitter convex lens assemblies, the one or more transmitter convex lens assemblies configured to receive the divergent power light beam and to transmit an aligned power laser light beam to a first optical antenna;
one or more transmitter mirror assemblies, the one or more transmitter mirror assemblies configured to receive and reflect a data laser light beam to the first optical antenna which creates the combined power and data laser light beam; and
one or more motorized gimbal assemblies, the one or more motorized gimbal assemblies configured to receive an alignment signal from a receiver device and to align the one or more transmitter convex lens assemblies, the one or more transmitter concave lens assemblies, the one or more transmitter mirror assemblies or the first optical antenna with respect to the receiver device;
a second optical antenna to receive the combined power and data laser light beam from the transmitting device;
one or more receiver mirror assemblies, the one or more receiver mirror assemblies configured to receive a receiver data laser light beam without the power laser light beam and to reflect a receiver data laser light beam to one or more optical data transceivers;
one or more receiver convex lens assemblies, the one or more receiver convex lens assemblies to receive a receiver power laser light beam without the data laser light beam and to generate a diverging receiver power laser light beam; and
one or more receiver concave lens assemblies, the one or more receiver concave lens assemblies configured to receive the diverging power laser light beam and to transmit or generate a receiver revised power light laser beam to one or more laser power converters in the receiver device.

18. The combining and alignment device of claim 17, wherein the one or more transmitter mirror assemblies is positioned to create the reflected data laser light beam in a center of the aligned power laser light beam and in alignment with the power laser light beam.

19. The combining and alignment device of claim 17, wherein the one or more transmitting mirror assemblies blocks a center area of the aligned power laser light beam.

20. The system of claim 17, further comprising a receiver motorized gimbal assembly, the receiver gimbal assembly configured to receive an alignment signal from a transmitter device and to align the one or more receiver convex lens assemblies, the one or more receiver concave lens assemblies, the one or more receiver mirror assemblies or the receiver optical antenna with respect to the transmitter device.

* * * * *